United States Patent [19]
Morimoto et al.

[11] Patent Number: 5,812,997
[45] Date of Patent: Sep. 22, 1998

[54] METHOD AND APPARATUS FOR DERIVING AN ASSOCIATION RULE BETWEEN DATA

[75] Inventors: Yasuhiko Morimoto, Yamato; Takeshi Fukuda; Shinichi Morishita, both of Yokohama; Takeshi Tokuyama, Machida, all of Japan

[73] Assignee: International Business Machines Incorporated, Armonk, N.Y.

[21] Appl. No.: 735,911

[22] Filed: Oct. 25, 1996

[30] Foreign Application Priority Data

Oct. 26, 1995 [JP] Japan .................................. 7-278690
Mar. 1, 1996 [JP] Japan .................................. 8-044660

[51] Int. Cl.$^6$ .................................................. G06F 17/30
[52] U.S. Cl. ................................................. 707/2; 705/10
[58] Field of Search ................................. 707/2, 3, 4, 5, 707/6; 705/10

[56] References Cited

U.S. PATENT DOCUMENTS 5,365,426  11/1994  Siegel et al. ............................. 600/509
5,615,341   3/1997  Agrawal et al. .......................... 705/10

OTHER PUBLICATIONS

R. Agrawal et al., "Mining Association Rules Between Sets of Items in Large Databases", Proc. of the ACM SIGMOD Conference on Management of Data, Washington, DC, May 1993, pp. 207–216.

R. Agrawal et al., "Database Mining: A Performance Perspective", IEEE Transactions on Knowledge and Data Engineering, Special Issue on Learning and Discovery in Knowledge–based Databases, Dec. 1993, pp. 914–925.

R. Agrawal et al., "Fast Algorithms for Mining Association Rules", Proc. of the VLDB Conference, Santiago, Chile, Sep. 1994, pp. 487–499.

R. Agrawal et al., "Mining Sequential Patterns", Proc. of the International Conference on Data Engineering, Mar. 1995, pp. 3–14.

J. Han et al., "Discovery of Multiple–level Association Rules from Large Databases", Proc. of the VLDB Conference, Zurich, Switzerland, Sep. 1995, pp. 420–431.

M. Houtsma et al., "Set–oriented Mining for Association Rules in Relational Databases", Proc. of the 11th Conference on Data Engineering, 1995, pp. 25–33.

H. Mannila et al., "Improved Methods for Finding Association Rules", Pub. No. C–1993–65, University of Helsinki, 1993.

J. S. Park et al., "An Effective Hash–based Algorithm for Mining Association Rules", Proc. of the ACM SIGMOD Conference on Management of Data, San Jose, California, May 1995, pp. 175–186.

A. Savasere et al., "An Efficient Algorithm for Mining Association Rules in Large Databases", Proc. of the 21st VLDB Conference, Zurich, Switzerland, Sep. 1995, pp. 432–444.

G. P. Shapiro, "Discovery, Analysis, and Presentation of Strong Rules", Knowledge Discovery in Databases, AAAI/MIT Press, Menlo Park, California, 1991, pp. 229–248.

*Primary Examiner*—Thomas G. Black
*Assistant Examiner*—Jack M. Choules
*Attorney, Agent, or Firm*—Khanh Q. Tran

[57] ABSTRACT

A method is described for finding correlation between a plurality of data having two kinds of numerical attributes and a true-false attribute. The method comprises the steps of: constituting a plane with two numerical attributes, dividing the plane into meshes, and counting the number of data in each mesh (also called a "bucket") and the number of data whose true-false attribute represents true. If each mesh is assumed to be a pixel, such plane can be considered as a plane image in which the number of data corresponds to brilliance, and the number of data whose true-false attribute represents true corresponds to saturation. The method further includes the step of segmenting an admissible image which is convex along an axis of the plane according to a predetermined condition θ to find an area with strong correlation. If the segmented area as the admissible image satisfies the above-described condition such as the maximized support rule, the method also presents the area to the user. In addition, necessary attributes for data included in the area are also extracted from a database, as required.

23 Claims, 13 Drawing Sheets

METHOD AND APPARATUS FOR DERIVING AN ASSOCIATION RULE BETWEEN DATA

FIELD OF THE INVENTION

The present invention relates to the analysis of correlation between data in a database (hereinafter called "data mining"), and more particularly, to determine correlation between data including two kinds of numerical attributes and one kind of true-false attribute (also called "true-false condition" or "0–1 attribute").

BACKGROUND OF THE INVENTION

For example, consider a case in analyzing customers of a bank to actually solve a problem on how old customers having how much liquid deposit balance and having time deposit balance of two million yen or more are 20% of the entire customers. The liquid deposit balance and the age are integers but continuous values, while the time deposit balance of two million yen or more has a true-false attribute because it is whether a person has two million yen or more or not. The true-false attribute may be replaced with, for example, a problem of "a customer has a credit card or not," or "a customer is male or not." If such problem can be solved, the bank can easily determine what type of persons it should send direct mail on, for example, a new financial product so that it can efficiently perform its business.

Conventionally, studies on quickly extracting a rule representing a correlation between the above-mentioned true-false attributes (association rule) have been performed in the field of data mining. Refer to, for example, R. Agrawal, T. Imielinski, and A. Swami, "Mining Association Rules between Sets of Items in Large Databases," Proceedings of the ACM SIGMOD Conference on Management of Data, May 1993, and R. Agrawal and R. Srikant, "Fast Algorithms for Mining Association Rules," Proceedings of the 20th VLDB Conference, 1994.

In addition, conventional methods for finding a rule between two kinds of numerical data includes:

1. Methods for searching for a straight line in a plane optimally approximating a point set so as to find a strong linear correlation. They include the least square method and the recursive center method. The disadvantages of these methods lie in that they can determine only the linear correlation, and that, when the absolute value of correlation coefficient is 0.5 or less, the prediction of each data with the linear correlation provides a low accuracy so that it is hardly used in practice.

2. Methods for searching for a square, rectangle, circle or ellipse on a plane including many data for an area so as to find weak global correlation. These include methods utilizing a computational geometry algorithm. One disadvantage of these methods is that it takes much calculation time. In the case of a circle, for example, it takes time of O ($M^3$), meaning that the calculation time is of order $M^3$ where M is the number of data. In addition, such a method can handle only predetermined geometries as a correlation area. However, there are few cases where the area can be properly covered by a predetermined geometry.

3. Methods for dividing a plane into square meshes, and extracting data. However, the extracted pixels in a set are not connected, but are often discrete so that a rule is difficult to be found.

When the above methods are used, in addition to the mentioned disadvantages, there is also a disadvantage that for many of the rules between data, it is difficult to distinguish whether they are meaningful or meaningless. In general, a human operator is often necessary to determine whether or not a correlation has any practical meaning. The methods in sections (1) and (2) above tend to overlook meaningful correlations because they can extract only special correlations, while, in the methods of the section (3) above, a human operator cannot determine any rule in the outputs even if he or she observes them.

As described above, conventionally, there is no effective method for finding a correlation between data having two or more kinds of numerical attributes, nor a method for data mining between true-false attributes and numeric attributes. Thus, there is no present method which can be used for finding correlation between data having two or more kinds of numerical attributes and a true-false attribute.

In view of the above problems, the present invention proposes a method for finding a correlation between data having two or more kinds of numerical attributes and a true-false attribute.

Specifically, it is also an object of the present invention to derive a range (area) which satisfies (1) a maximized support rule in which the ratio of data whose true-false attribute representing true is at a predetermined value or more, and the number of included data is maximized; (2) a maximized confidence rule in which, when the number of data to be included at the minimum is determined, the ratio of data whose true-false attribute representing true is maximized; (3) an optimized entropy rule in which, when it is considered to divide the inside of an area to be extracted and its outside, increment of the amount of information after division when compared with the amount of information before division is maximized; and (4) an optimized interclass variance rule in which, when the inside and outside of an area are considered to be divided, the sum of squares of the internal and external "variance of standardized ratio of true and false from average" is maximized.

It is another object of the present invention to provide a method that performs such correlation between data in practical time.

It is still another object of the present invention to present the correlation between data in a form easily recognizable for a human operator. In addition, it is yet another object of the present invention to allow a user to visualize various correlations.

SUMMARY OF THE INVENTION

Usually, an object to be analyzed has various numerical attributes. The above objects are attained by performing the following steps for two kinds of numerical attributes selected from those various attributes and one kind of true-false attribute:

(1) Constituting a plane with two numerical attributes, dividing the plane into meshes, and counting the number of data in each mesh (also called a "bucket") and the number of data whose true-false attribute represents true. If each mesh is assumed to be a pixel, such plane can be considered as a plane image in which the number of data corresponds to brilliance, and the number of data whose true-false attribute representing true corresponds to saturation or hue.

(2) Segmenting an admissible image which is convex along an axis of the plane according to a predetermined condition θ to find an area with strong correlation. A partial image (partial area) satisfying the condition that it is convex along an axis of the plane as described earlier is segmented as the admissible image.

(3) If the segmented area as the admissible image satisfies the above-described condition such as the maximized support rule, it presents the area to the user. In addition, necessary attributes for data included in the area are also extracted from a database, as required.

It may be possible to make it easy to find a desired association rule by presenting the segmented area to the user as is, or, when a plurality of areas are segmented, by visualizing them as motion images.

In addition, once an area is segmented, it may be possible to perform the segmenting step again to find another association rule by averaging the saturation or hue of the segmented area.

In the case of the first described example, a plane is formed by providing an axis for the liquid deposit balance and an axis for the age. The plane is divided into appropriate meshes. Then, each mesh is counted for the number of applicable customers and the number of customers having the time deposit balance of two million yen or more. Then, a maximized confidence rule can be obtained by segmenting an area as an admissible image which includes 20% of the customers and in which the ratio of the customers having the time deposit balance of two million yen or more is at the maximum.

In addition, a maximized support rule can be obtained by segmenting an area in which the ratio of the customers having the time deposit balance of two million yen or more is 10% and which has the maximum number of the customers.

In summary, in a database having a plurality of data including at least two kinds of numerical attributes and one kind of true-false attribute, a method for deriving an association rule between the plurality of data is provided. This method comprises the steps of: (a) constituting a plane for storing the number $u(i, j)$ of data included in each bucket $(i, j)$ and the number $v(i, j)$ of data whose true-false attribute represents true in each bucket, wherein the plane has two axes corresponding to the two kinds of numerical attributes and is divided into N×M buckets; (b) inputting a condition $\theta$; (c) segmenting an area S from said plane, wherein the buckets included in the area S maximize Equation (1):

$$\sum_{(i,j) \in S} g(i,j) = \sum_{(i,j) \in S} (v(i,j) - \theta u(i,j)) \qquad (1)$$

and (d) outputting data included in the segmented area S.

The method may further comprise the steps of: (e) inputting a second condition $\theta_2$ different from the condition $\theta$; (f) segmenting a second area $S_2$ from the plane, wherein the buckets included in the area $S_2$ maximize Equation (2):

$$\sum_{(i,j) \in S_2} g(i,j) = \sum_{(i,j) \in S_2} (v(i,j) - \theta_2 u(i,j)) \qquad (2)$$

and (g) segmenting a third area $S_3$ from the plane, wherein the buckets included in the area $S_3$ maximize Equation (3):

$$\sum_{(i,j) \in S_3} g(i,j) = \sum_{(i,j) \in S_3} (v(i,j) - \theta_3 u(i,j)) \qquad (3)$$

with a third condition (Equation 4):

$$\theta_3 = \frac{V(S_2) - V(S)}{U(S_2) - U(S)} \qquad (4)$$

where $V(S_2)$ is the number of data included in the area $S_2$ and whose true-false attribute represents true, $V(S)$ is the number of data included in the area S and whose true-false attribute represents true, $U(S_2)$ is the number of data included in the area $S_2$, and $U(S)$ is the number of data included in the area S. Such processing is useful when the originally desired rule cannot be derived under the first condition $\theta$.

Moreover, the method may further comprise the steps of modifying $v(i, j)$ such that $v(i, j)/u(i, j)$ in each bucket in the segmented area S becomes equal to the ratio of the number of data whose true-false attribute represents true in the whole plane to the number of data in the whole plane; and segmenting a fourth area $S_4$, wherein the buckets included in the area $S_4$ maximize Equation (5):

$$\sum_{(i,j) \in S_4} g(i,j) = \sum_{(i,j) \in S_4} (v(i,j) - \theta_4 u(i,j)) \qquad (5)$$

by using the modified $v(i, j)$ according to a condition $\theta_4$ which is input. This enables it to derive a secondary correlation rule.

Furthermore, the plane constituting step may comprise the steps of randomly sampling X data from a plurality of data; sorting the sampled data for each of numerical attributes and storing a value corresponding to the (X*/N)-th data (i=1, 2, ... N) and a value corresponding to the (X*/M)-th data (n=1, 2, ... M); and placing a plurality of data into N×M buckets based on the stored values. This enables it to allocate data to each bucket at a high speed.

The method may use $$g(i,j) = v(i,j) - \theta u(i,j) \qquad (6)$$

as an evaluation value. The area segmenting step may comprise the steps of deriving a range in each column in the plane wherein a range includes at least one bucket and the evaluation value is maximized; when an addition region is defined as a region which includes an area having a first bucket (m−1, l) in a previous column of a second bucket (m, t) in the plane and having a maximum evaluation value up to the previous column and a range derived by the range deriving step, including a second bucket (m, t) and a third bucket (m, l) on the same row as said first bucket and in the same column as said second bucket and having a maximum evaluation value in the column of the second and third buckets, for each of the second buckets, detecting one of the first buckets whose inclusion with the one second bucket in the addition region makes the evaluation value of the addition region maximum, and storing the evaluation value of the addition region and the one of the first buckets; and detecting one of said second buckets included in the addition region which has a maximum evaluation value in the whole plane, and deriving the area S by using the first bucket detected in the detecting and storing step for the detected one of said second buckets.

Furthermore, the method may further comprise the steps of inputting the minimum support number $U_{min}$, wherein $U_{min}$ is the minimum number of data included in the area to be segmented; comparing the number of data U(S) included in the segmented area S with the minimum support number $U_{min}$; if the comparison indicates $U_{min}$=U (S), outputting the area S as the area to be segmented; and, if the comparison indicates $U_{min}$>U (S) or $U_{min}$<U (S), performing the area segmenting step under a new condition $\theta_5$. This enables it to derive the confidence maximization rule.

Furthermore, the method may further comprise the steps of inputting a value minconf, which is the ratio of the number of data whose true-false attribute represents true in the area to be segmented; if minconf=V (S)/U (S) for the segmented area S, where U (S) is the number of data included in the area S, V (S) is the number of data included in the area S and whose true-false attribute represents true in the area, outputting the area S; and, if minconf<V (S)/U (S) or minconf>V (S)/U (S), performing the area segmenting step under a new condition $\theta_6$. This enables it to derive the maximized support rule.

Furthermore, the method may further comprise the steps of calculating an entropy for the segmented area S by the following Equation (7):

$$f(U(S),V(S)) = -\frac{V(S)}{U_{sum}} \log \frac{V(S)}{U_{sum}} - \frac{U(S)-V(S)}{U_{sum}} \log \frac{U(S)-V(S)}{U_{sum}} - \frac{V_{sum}-V(S)}{U_{sum}-U(S)} \log \frac{V_{sum}-V(S)}{U_{sum}-U(S)} - \frac{U_{sum}-V_{sum}-U(S)+V(S)}{U_{sum}-U(S)} \log \frac{U_{sum}-V_{sum}-U(S)+V(S)}{U_{sum}-U(S)} \quad (7)$$

where $U_{sum}$ is the number of data over the whole plane, and $V_{sum}$ is the number of data included in the whole plane whose true-false attribute represents true, and storing the value in correspondence to the area S; performing the area segmenting step and the entropy calculating step by changing the conditions; and outputting an area S which makes f (U (S), V (S)) maximized, whereby enabling it to find the optimized entropy area.

Furthermore, the method may further comprise the steps of calculating an interclass variance for the segmented area S by $$f(U(S),V(S)) = U(S)\left(\frac{V(S)}{U(S)} - \frac{V_{sum}}{U_{sum}}\right)^2 + (U_{sum}-U(S))\left(\frac{V_{sum}-V(S)}{U_{sum}-U(S)} - \frac{V_{sum}}{U_{sum}}\right)^2 \quad (8)$$

and storing the value in correspondence to the area; and outputting an area S which makes f (U (S), V (S)) maximized. This enables it to segment an optimized interclass variance area.

An apparatus implementing the above method, and a storage device or storage medium storing a program which has such a computer implemented method, may also be made. Such apparatus and device are further described in the following detailed description.

DESCRIPTION OF THE PREFERRED EMBODIMENT

First, it will be illustrated how the steps of the present invention are performed.

1. Plane Constituting Step

Figure 1:
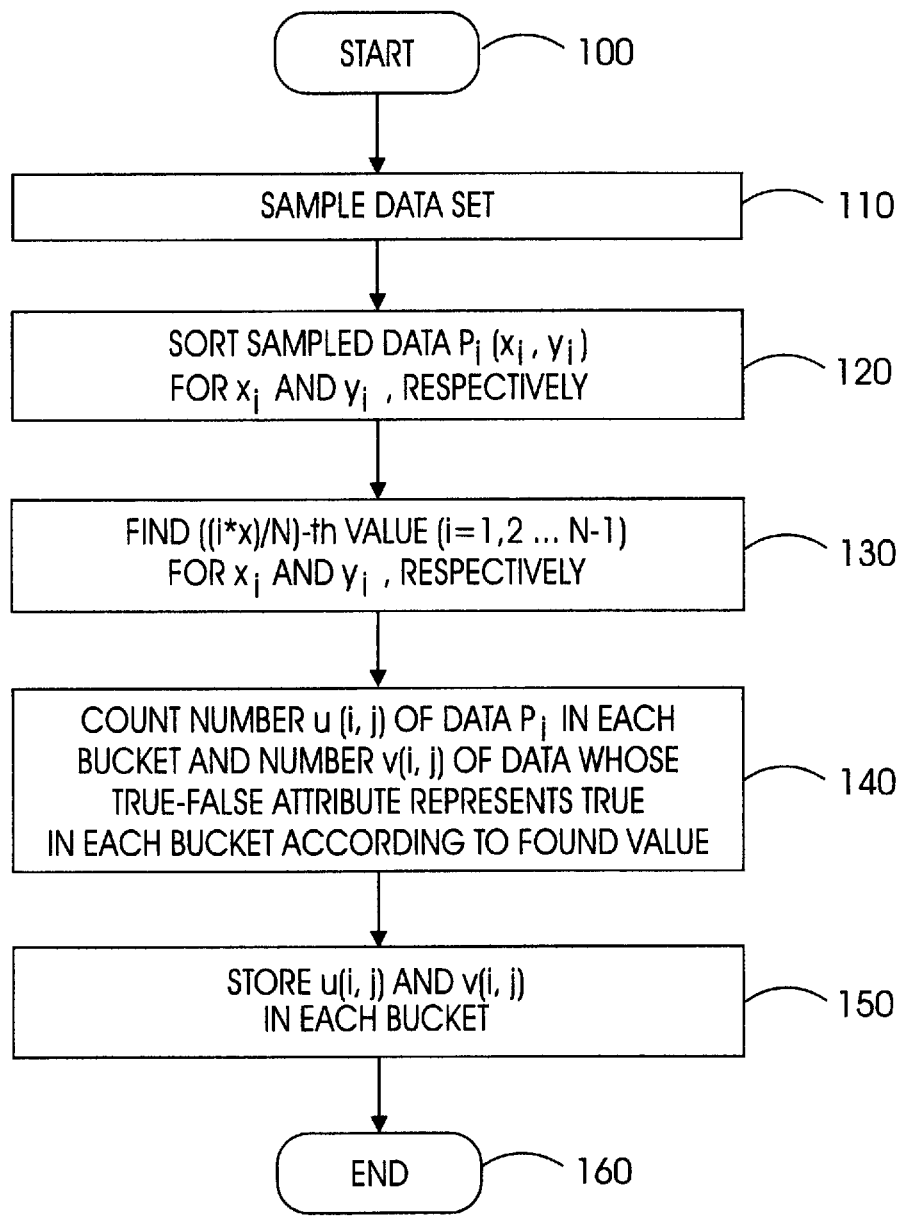
FIG. 1 is a flowchart illustrating a plane constituting step.

FIG. 1 shows the flow of a plane constituting step. The process starts at step 100, and first randomly samples data from a data set P (step 110). The sampled data pi $(x_i, y_i)$ ($x_i$ and $y_i$ representing two kinds of numerical attributes of data) are sorted for $x_i$ and $y_i$, respectively (step 120). In this case, a plane is assumed which has two axes corresponding to the two kinds of numerical attributes, respectively, and is divided into N buckets for each axis. That is, the plane would have $N^2$ buckets. Then, the (i*X/N)-th values (i=1, 2, ... N−1) are located for $x_i$ and $y_i$, respectively (step 130). This causes the number of data belonging to each column and each row to match each other. Since the boundary numerical value of each bucket can be determined by using the (i*X/N)-th values (i=1, 2, ... N−1) for $x_i$ and $y_i$, respectively, the number u(i,j) of data pi in each bucket (i, j) and the number v(i,j) of data whose true-false attribute represents true in each bucket are counted by using the boundary value (step 140). The u (i, j) and v (i, j) are stored for each bucket (step 150). In other words, it can be said that a matrix u (i, j) and a matrix v (i, j) are constructed.

The randomly sampling is performed as described above because it takes much time if all data are sorted. However, there may be a case which allows sorting. In addition, the number of data randomly sampled is preferably to be about 30N to 50N. While an example is indicated above where both axes are divided into N, they may be divided into different number. Typically, N is about 100.

The above is merely an example, and other approaches may be employed. For example, the boundary numerical value for each bucket may be a predetermined value. Moreover, the data value may be uniformly or logarithmically divided.

Figure 2:
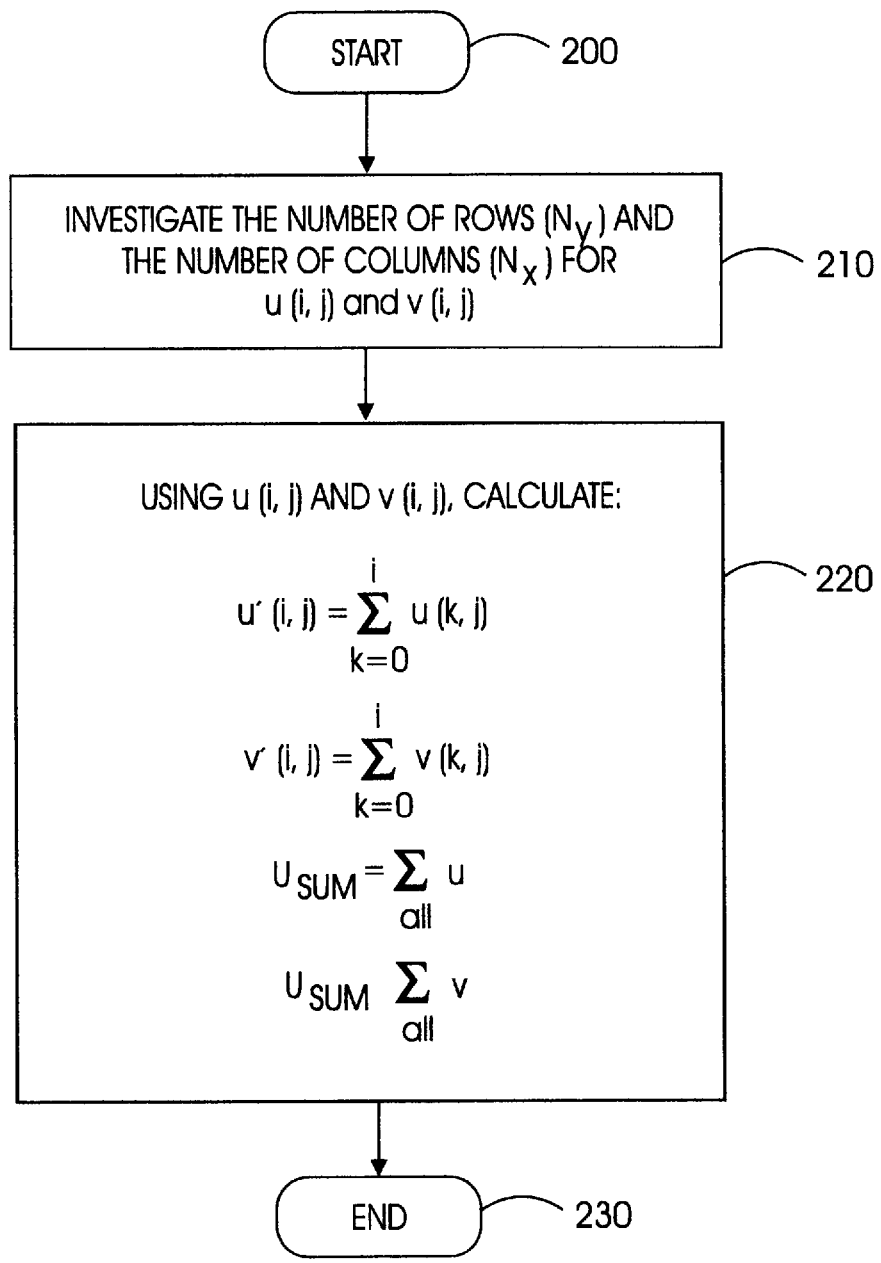
FIG. 2 is a flowchart illustrating the preparation for an area segmenting step.

Furthermore, the entire process may be performed at a higher speed if the following processing is performed for the subsequent process (FIG. 2). The number of rows ($N_y$) and the number of columns ($N_x$) are investigated for u (i, j) and v (i, j) (step 210). Then, the following matrixes of u' (i, j) and v' (i, j) are newly constructed by using previously constructed u (i, j) and v (i, j) (step 220).

$$u'(i,j) = \sum_{k=0}^{i} u(k,j) \quad (9)$$

$$v'(i,j) = \sum_{k=0}^{i} v(k,j) \quad (10)$$

The u' (i, j) and v' (i, j) are prepared for simplifying the sum operation of an objective function $$g(i,j)=v(i,j)-\theta u(i,j) \quad (11)$$

which will be frequently calculated later to become $$\sum_{k=i}^{j} g(k,m) = \sum_{k=i}^{j} v(k,m) - \theta \sum_{k=i}^{j} u(k,m) \quad (12)$$
$$= (v'(j,m) - v'(i-1,m)) - \theta(u'(j,m) - u'(i-1,m))$$

In addition, $$U_{sum} = \sum_{all} u \quad (13)$$

$$V_{sum} = \sum_{all} v \quad (14)$$

are also prepared because they are frequently used later.

With such preparation, the subsequent segmenting step can be performed at a high speed.

Since the plane constituted as above can be considered as a plane "image," a term "image" may be used. Likewise, a bucket may be called a pixel.

2. Area Segmenting Step

Figure 3:
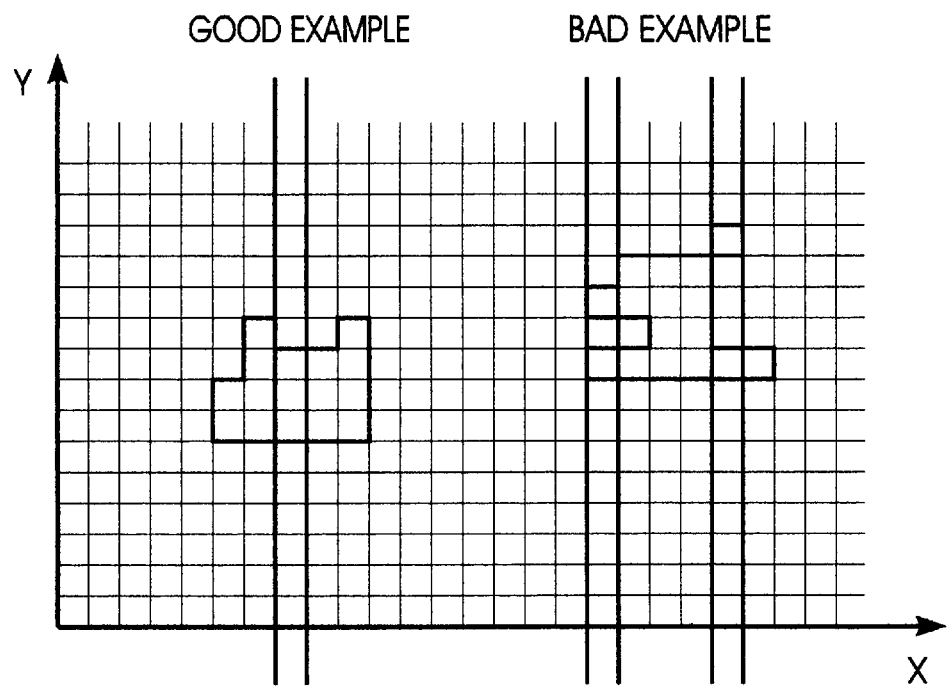
FIG. 3 is a diagram illustrating an admissible image.

The purpose of this step is to segment an area or admissible image from the previously formed plane (plane image). The admissible image means an image which is convex along one axis direction as described earlier. More specifically, it means a connected image surrounded by two curves monotonic to the X-axis direction. Examples of this are shown in FIG. 3. Shown in the left is an example where an image is always connected when it is cut by bands with width 1 extending in the Y-axis direction. Such image is called an admissible image. In addition, in the right, there is shown an example where an image is not connected when it is cut by the bands described above. When it is attempted to perform segmentation including such image, such problem would be an NP-hard problem.

When the problem is limited to such admissible image, since bands extending in the Y-axis direction are always connected, it is sufficient to sequentially connecting them by using dynamic programming. However, one more parameter should be specified. It may be, for example, the number of pixels (number of buckets) for an image only with gray levels. For example, when the user is caused to specify the number of pixels, it is possible to segment an admissible image which has that number of pixels and for which the sum of gray levels is maximized.

Connectivity of the entire admissible image can be understood when considering the following item. When an image including k pixels (buckets), comprising pixels to the left of m-column, and including a position (m, t) is assumed (see FIG. 4), and if the total of the values of gray levels is f (k, m, t) in this case, this image satisfies:

$$f(k,m,t) = \max_{t,l \in I} \left\{ f(k - |I|, m-1, l) + \sum_{i \in I} q(m,i) \right\} \quad (15)$$

where I is a continuous interval (range) at the m-th column on the X-axis, and includes t, l. In addition, since the continuous interval (range) at the (m−1)-th column on the X-axis used in calculating f (k−|I|, m−1, l) includes l, it connects to I. Therefore, all of the continuous intervals used until f (k, m, t) is found are guaranteed to be connected from the induction.

This enables it to perform calculation in an order of O (N⁶) so that, if $N^2=n$ (n being the number of pixels), it becomes O ($n^3$) which can be calculated at practical time.

Figure 5:
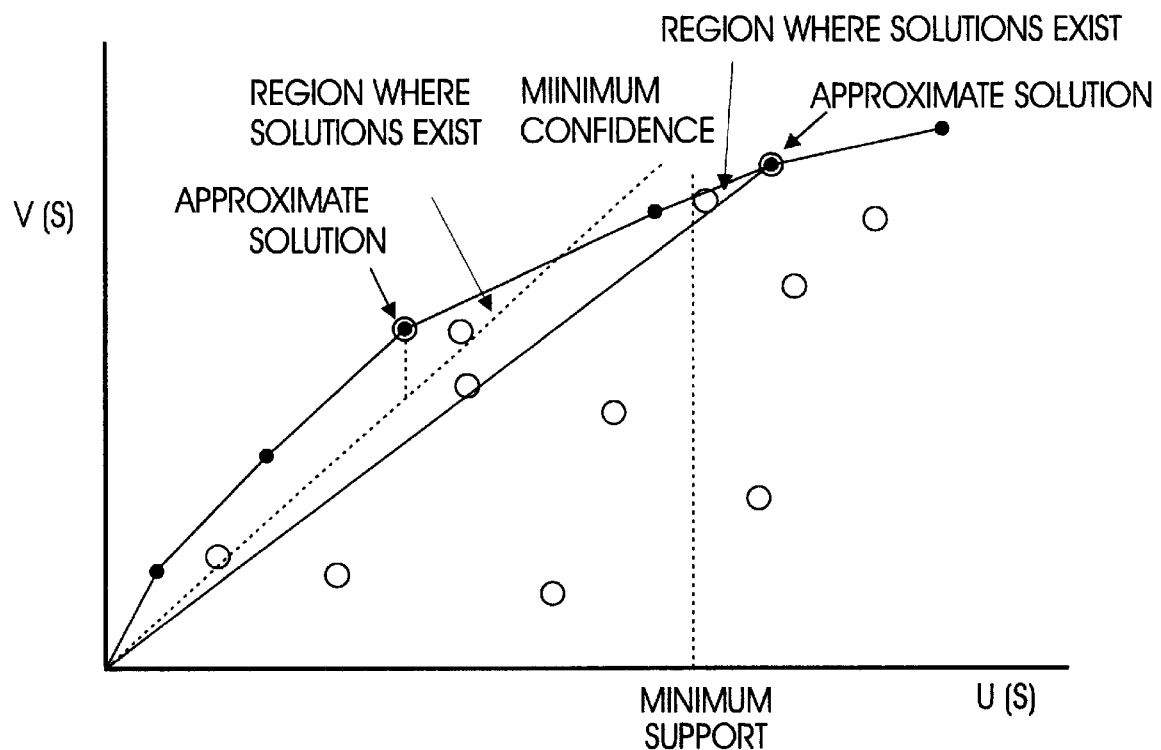
FIG. 5 is a graph illustrating a U (S), V (S) plane.

The above description is applicable to a case where the number of pixels (number of buckets) is identified for an image only with gray levels. Since the present invention is not limited only to gray levels, another approach is employed. That is, a plane as shown in FIG. 5 is assumed to the axis abscissa which represents the number of data U (S) included in an area S to be segmented, and the axis of ordinate which represents the number of data V (S) included in the area S to be segmented and whose true-false attribute represents true. Since there are many combinations of the number of data and the number of data whose true-false attribute represents true, the plane would have many points. Among those points, those constituting a convex hull are specifically used. That is, an approach is employed, wherein a curve is formed by connecting those points constituting the convex hull, a straight line with gradient θ is drawn to the curve from the top to find a point fist contacting the curve, and the image at that moment is output. An admissible image in this case is called a focused image. The focused image is represented by a black dot in FIG. 5. In addition, an approach drawing a straight line from the top is called a hand probe. As such, the present invention employs an approach inputting a gradient θ.

Only the points on a convex hull are handled because the maximized confidence rule can output points which are sufficient as approximation, and the optimized entropy rule and the optimized interclass variance rule are always on the convex hull. The maximized confidence rule and the maximized support rule are not always on a convex hull. Since, if the maximized confidence rule and the maximized support rule are strictly solved, the calculation does not complete in practical time, even an approximation can provide a sufficiently effective result.

Next a straight line is drawn with gradient θ from the top means to reduce Q which is a Y-intersect of a straight line y=θx+Q. The problem is to find a point having on the X-coordinate U (S) which maximizes Q=V (S)−θU (S). Thus, $$\max Q = \max \left\{ \sum_{(i,j) \in S} v(i,j) - \theta \sum_{(i,j) \in S} u(i,j) \right\} \quad (16)$$
$$= \max \sum_{(i,j) \in S} g(i,j)$$

Now, the solution to Equation 16 is described. Basically, an approach using the dynamic programming described earlier is employed. First, an area comprising buckets to the left of m-column, and including buckets at a position (m, t) is assumed, and those maximizing Equation 11 is to be f (m, t). The following conditions must be satisfied:

$$f(m,t) = \max_{t,l \in I} \left\{ f(m-1,l) + \underbrace{\sum_{i \in I} g(i,m)}_{(B)} \right\} \quad (17)$$
$$= \max_{l} \left\{ f(m-1,l) + \underbrace{\max_{t,l \in I} \sum_{i \in I} g(i,m)}_{(A)} \right\}$$

Part (A) in Equation 17 means to determine from the entire continuous interval (range) containing t and l a continuous interval (range) I maximizing part (B) in Equation 17.

The interval I is represented as cover (t, l). Now, if t≦l, and low (t) and high (l), which are defined later, are used, $$\text{cover}(t,l) = [\text{low}(t), t] \cup [t, l] \cup [l, \text{high}(l)] \quad (18)$$

where low (t) is i maximizing part (B) in Equation 17 in the entire continuous interval [i, t], while high (l) is j maximizing part (B) in Equation 17 in the entire continuous interval [l, j].

Since these low (t) and high (l) are frequently used in the dynamic programming, it is effective if they are quickly found. To this end, a matrix K is constructed in which part (B) in Equation 17 in the continuous interval [i, j] is contained in an element K (i, j), where K (i, j)=(i−j) x for i>j (x is a negative value with a sufficiently large absolute value. For example, it is sufficient to be a number the absolute value of which is larger than sum for entire u (i, j)). Then, the column number for a column having the maximum value at row number I becomes high (l). Thus, the problem of finding high (l) for all I∈[1, N] becomes a problem of finding column numbers for the maximum value of each row of K. Such calculation can be performed with amount of calculation for O (N).

Elements in a matrix are compared to determine the maximum value in finding the column number for the maximum number. This comparison can be easily carried out when u' and v' found earlier in Equations 9 and 10 are used.

Figure 6:
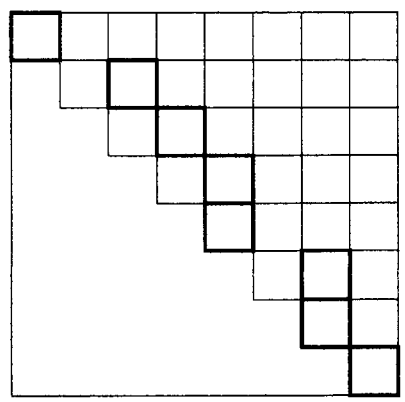
FIG. 6 is a diagram illustrating a completely monotonic matrix.

When the maximum value of each row is noted in K, the column number for maximum value monotonically increases as the row number increases. However, if there are a plurality of maximum values on the same row, only the one at the left end is considered. Such matrix is referred to as a "monotonic matrix." Although its demonstration is omitted, the matrix K is also a "completely monotonic matrix" (a matrix in which any partial matrix is a monotonic matrix). An example of K is shown in FIG. 6 in which the shaded areas represent the maximum value in each row. Amount of calculation for O (N log N) is required to calculate column numbers having the maximum values of all rows in a monotonic matrix. The algorithm for finding the column number of the maximum value in each row is well known, and described, for example, in Chapter 4 "Basic Technique of Computational Geometry" of "Computational Geometry," Tetsuo Asano, Asakura Shoten, September 1990.

Likewise, when low (t) is calculated, it is obtained by constructing a matrix L in which part (B) in Equation 17 in the continuous interval [i, j] is contained in an element L (j, i), and finding the column number for a column having the maximum value on the row number t. Here, the upper triangular area (i>j) is to be −∞. Such matrix is also a completely monotonic matrix.

Using low (t) and high (l) thus found, cover (t, l) can be found so that the following equation, which is a variation of Equation 17 can be calculated.

$$f(m,t) = \max_{l} \left\{ f(m-1,l) + \sum_{i \in \text{cover}(t,l)} g(i,m) \right\} \quad (19)$$

An image making f (m, t) maximum can be found by sequentially calculating f (m, t) for bands perpendicular to the X-axis, storing these bands, and then connecting them.

To further improve the speed, a matrix M is constructed which has $$M(t,l) = f(m-1,l) + \sum_{i \in \text{cover}(t,l)} g(i,m) \quad (20)$$

as its element. Then, the maximum value of the row number is f (m, t). M is a completely monotonic matrix described above, and f (m, t) can be calculated for all t with O (N). Thus, amount of calculation of O ($N^2$) is necessary to calculate f (m, t) for all m.

The necessary steps are as follows:

(1) Calculate low (t) and high (l) for all bands perpendicular to the X-axis.

(2) Calculate a matrix M with Equation 20 as its element since cover (t, l) is found from low (t) and high (l).

(3) Find the maximum value of each row in the matrix M, and store their values as f (m, t).

(4) Enter the column number I indicating the maximum value of each row in the matrix M into s (m, t) to determine the entire image.

(5) Find m and t maximizing f (m, t), and determine the image with low (t) and high (I) in the previous column by using s (m, t) obtained in (4) and I stored in s (m, t).

Figure 7:
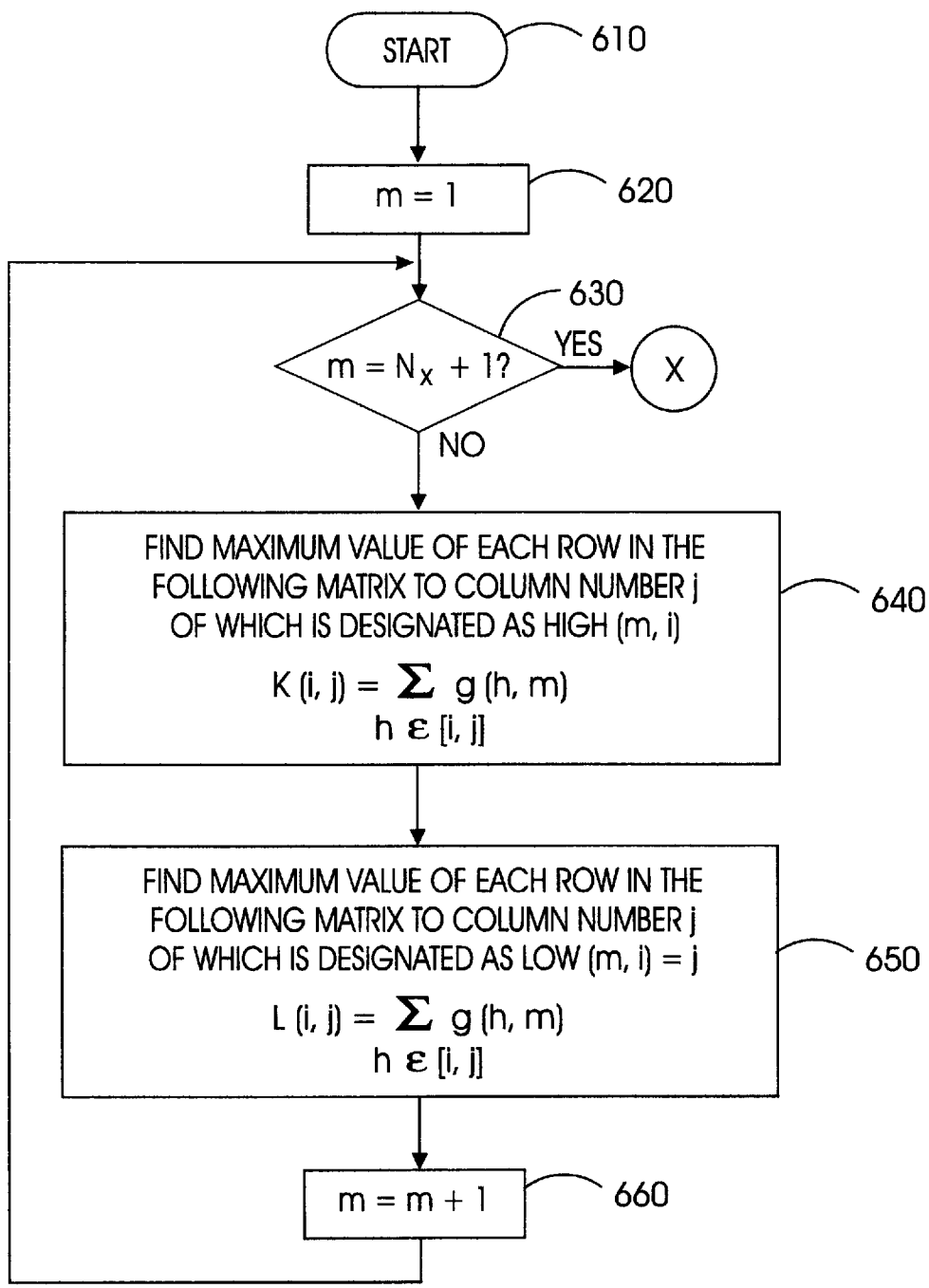
FIG. 7 is a flowchart showing a part of the segmenting step.
Figure 8:
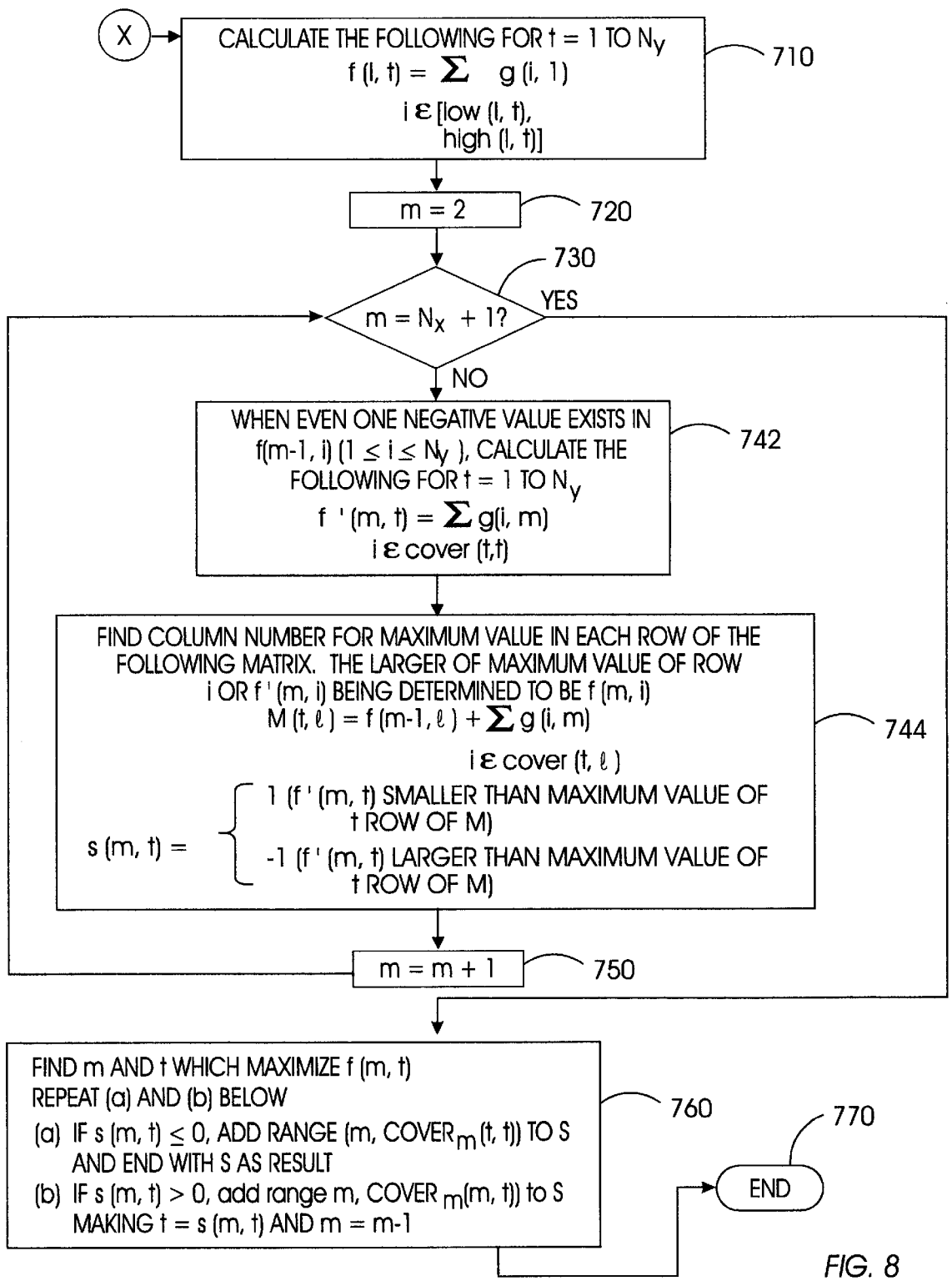
FIG. 8 is a flowchart showing a part of the segmenting step.

These steps are shown in FIGS. 7 and 8. The process starts at step 610 which performs initialization of m=1 at step 620. It then determines whether m=Nx+1 (step 630). This step is repeated Nx times where Nx is the number of columns in u (i, j) and v (i, j).

Then, $$K(i,j) = \begin{cases} (i,j)x & (i > j) \\ \sum_{h \in [i,j]} g(h,m) & (i \le j) \end{cases} \quad (21)$$

is calculated to find the maximum value of each row in this matrix the column number j of which is designated as high (m, i) (step 640). Thus, high (i) on m-th column of the plane (plane image) is found.

In addition, Equation (22)

$$L(i,j) = \begin{cases} -\infty & (j > i) \\ \sum_{h \in [j,i]} g(h,m) & (j \le i) \end{cases} \quad (22)$$

is calculated to find the maximum value of each row in this matrix, the column number j of which is designated as low (m, i) =j (step 650). Thus, low (i) on m-th column of the plane (plane image) is found.

Then, the process increments m by 1 (step 660), and returns to step 630. As described, first, all low and high are previously calculated. Although it may be arranged to calculate necessary low and high every execution of calculations in FIG. 8, they may be calculated at once as in this example. After they are calculated at once as described above, the process proceeds to FIG. 8 through X.

Figure 4:
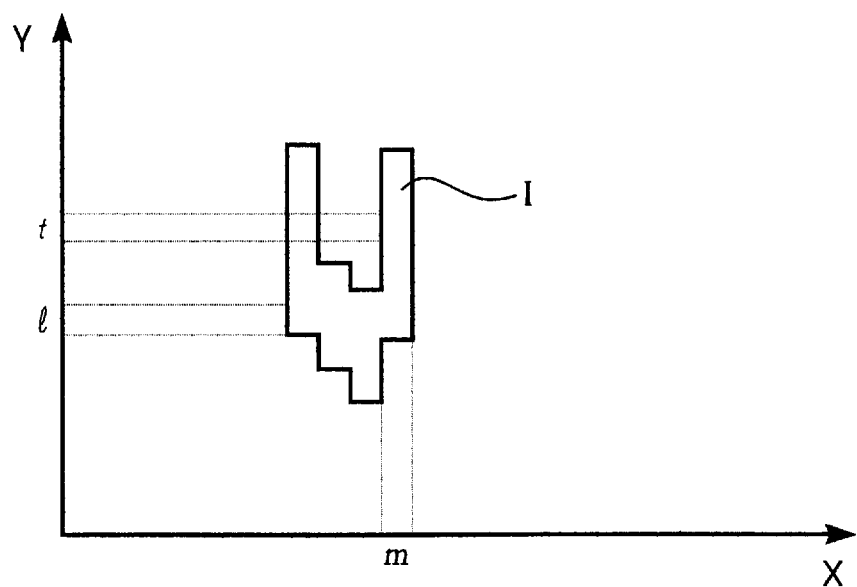
FIG. 4 is a diagram illustrating connectivity of an admissible image.

In FIG. 8, the process calculates f (m, t) from X. First, processing is performed on the left most column of said plane as shown in FIG. 4.

$$f(1,t) = \sum_{i \in [\text{low}(1,t), \text{high}(1,t)]} g(i,1) \quad (23)$$

In step 710, Equation (23) above is calculated for t=1 to Ny. Here, Ny is the number of rows in u (i, j) and v (i, j). With such procedure, one to be the initial value of the first term in Equation 20 is calculated.

In addition, it is arranged s (l, t)=−1. This is to explicitly indicate that there is no connection in the previous column because this is the first column.

Then, m is set to m=2 to calculate values for m=2 and thereafter (step 720). In addition, it is determined whether m=Nx+1 to repeat the loop (Nx−1) times (step 730). If not m=Nx+1, and when even one negative value exists in f (m−1, i) (1≤i≤$N_y$), $$f'(m,t) = \sum_{i \in \text{cover}_m(t,t)} g(i,m) \quad (24)$$

is calculated for t=1 to $N_y$ (step 742). Here, $\text{cover}_m$ (t, t) means cover (t, t) on the m-th column. Then, $$M(t,l) = f(m-1,l) + \sum_{i \in \text{cover}_m(t,l)} g(i,m) \quad (25)$$

The column number for the maximum value in each row of this matrix is found (step 744). Then, the maximum value of row i is compared with f' (m, i), and the larger one is determined to be f (m, i). Then, I is placed in s (m, t) when f' (m, t) is smaller than the maximum value of row t in M, otherwise, −1 is placed. This is to determine whether the value of the objective function for the area to be segmented is made larger by preserving the connection up to the previous column, or by discarding it.

Since, as described, s (m, t) is provided to preserve the connected state, if an (m, t) is determined, it can be determined later how the areas are connected by tracing back s (m, t).

Then, the process increments m by 1 (step 750), and returns to step 730. When the repetition completes, m and t maximizing f (m, t) are found. It is sufficient that m and t are arranged to be continuously held while constructing f (m, t), and to be updated when a point which has a value larger than that of m and t is encountered in a newly created area. The value of l for the previous column is found from s (m, t) by using m and t. The smaller of l and t is entered in low, and the larger is entered in high. For example, if t is the smaller, low (m, t) and high (m, l) can be found. Furthermore, since l' in the previous column is found from s (m−1, l), low (m−1, l') and high (m−1, l') are found. (Here, l is smaller than l') When such procedure is repeated, the entire image S can be determined (step 760). When −1 is obtained for a certain s (m, t), the area is completed. The process is terminated because the admissible image S corresponding to the gradient θ which has been input is obtained (step 770).

As described above, the admissible image S corresponding to the gradient θ can be obtained. The condition θ may be input by the user, or set by the system to find the maximized support rule.

3. Output Step

Since it is known from the previous steps where the area S, i.e., the obtained admissible image, occupies in the plane, it is possible to extract data belonging to the image S. Since data usually has not only the true-false attribute and the numerical attributes, but also other attributes, it is arranged to extract attributes such as name and address if it is intended, for example, to send direct mail. Since data to be extracted has been identified at this point of process, the process is merely a normal retrieval of a database, and will not be described in further detail. It is a matter of course that the focused image may be once arranged to clearly show its appearance and presented to the user.

Using the above steps, it is possible to find one of association rules between a plurality of data for a condition θ. The problem of how to establish the condition θ will be described next. Usually, only one condition θ fails to solve a problem. It is described in the following how to derive the four generic rules described above and other rules by using the above steps, and, more particularly, by using (1) the plane constituting step and (2) the area segmenting step as the engine.

a) A case to find a focused image existing in an interval

First, a case is examined for continuously presenting areas S which are admissible images (here, they are focused images) for several θs to create motion picture so that the user is caused to determine the size and geometry of an image to be segmented by his or her judgment.

Figure 9:
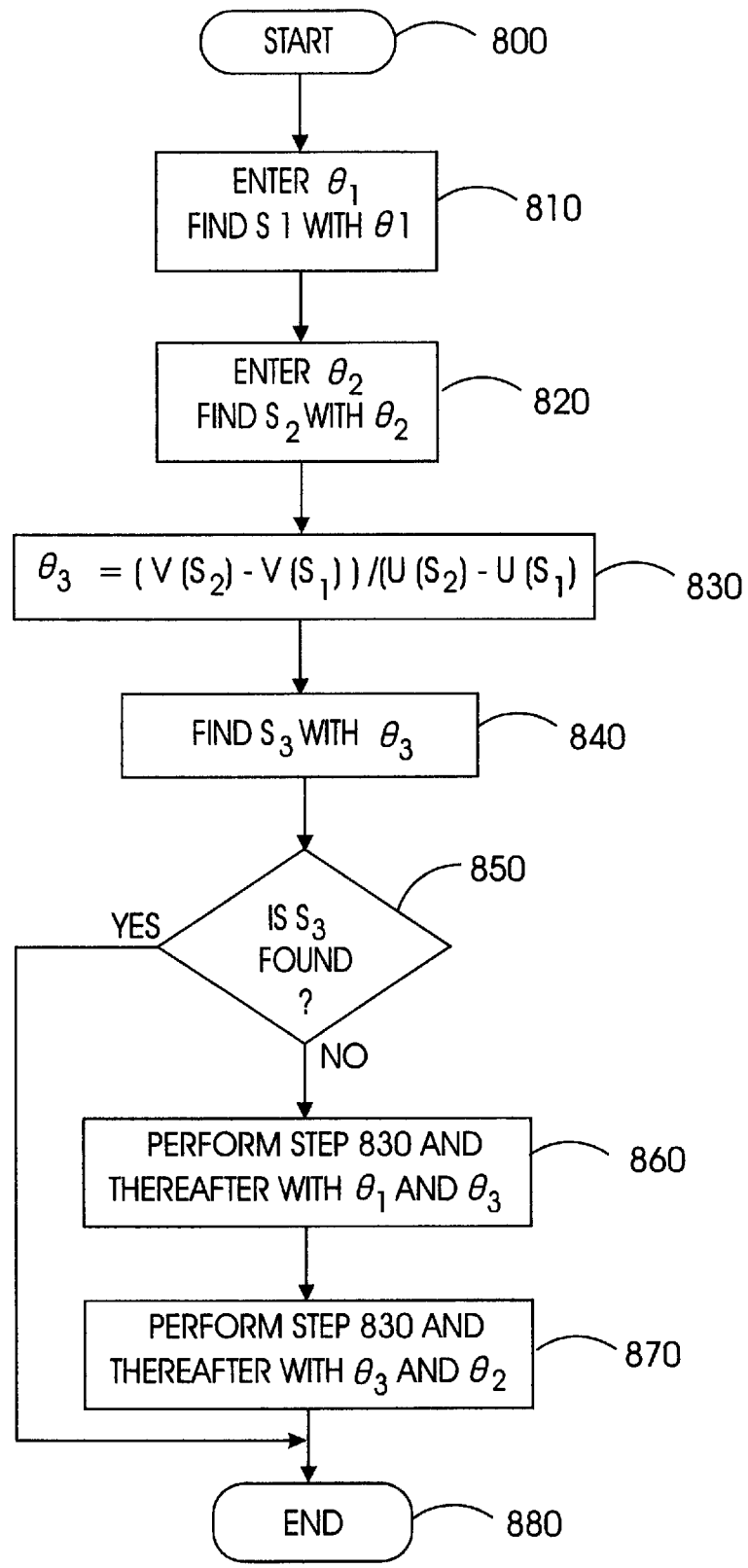
FIG. 9 is a flowchart showing a process for finding a plurality of focused images.

This process is shown in FIG. 9. The process starts at step 800 which first locates a focused image $S_1$ by inputting θ1 (step 810). Similarly, the user input θ2 is used to locate a focused image $S_2$ (step 820). When two focused images are found, the number of data included in each image U ($S_1$) and U ($S_2$), as well as the number of data whose true-false attribute representing true in each image V ($S_1$) and V ($S_2$) are used to calculate a new gradient $\theta_3$ intermediate between them (step 830).

Once the new $\theta_3$ is found, a focused image $S_3$ for $\theta_3$ can be further found (step 840). If a calculated $S_3$ has been found, then there is no other focused image in an interval $(\theta_1, \theta_2)$. Then, the process completes (step 880). However, if $S_3$ has not been found, step 830 and thereafter are performed by using $\theta_3$ in place of $\theta_2$ (step 860). That is, focused images existing in the interval $(\theta_1, \theta_3)$ are found. In this case, it may be arranged to sequentially calculate the intermediate values. In addition, the calculation may be terminated when a certain number of focused images are found. Furthermore, step 830 and thereafter are performed for $\theta_3$ and $\theta_2$ to calculate the focused images for the remaining interval $(\theta_3, \theta_2)$ (step 870). In this case also, it may be arranged to find all focused images existing in this interval, or to terminate the calculation when a predetermined number is found.

Figure 10A:
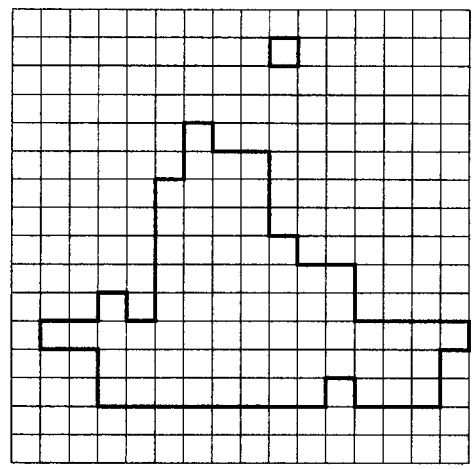
FIG. 10 is diagrams showing examples of focused images.
Figure 10B:
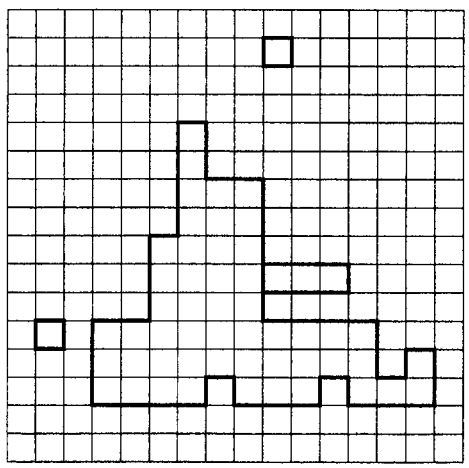
Figure 10C:
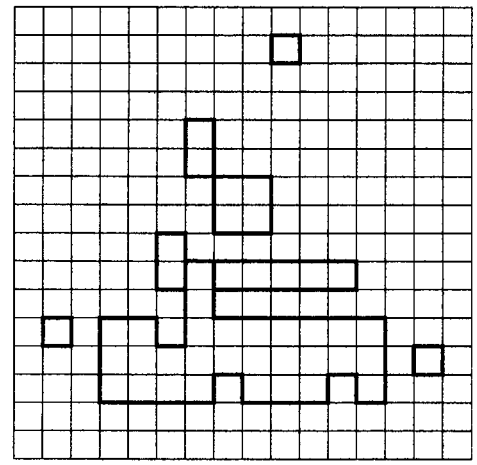
Figure 11:
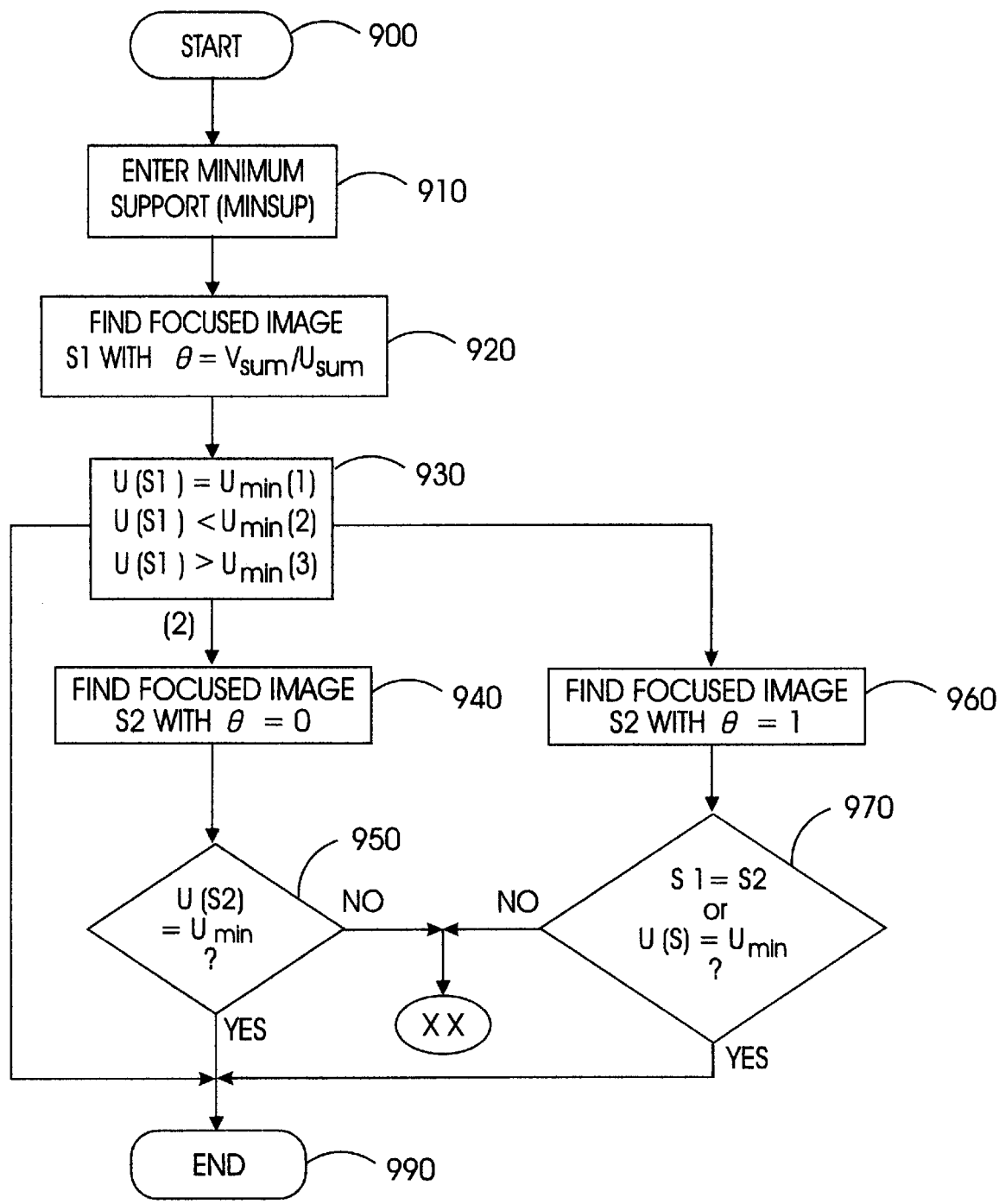
FIG. 11 is a flowchart showing the first part of the process for deriving the maximized confidence rule.
Figure 12:
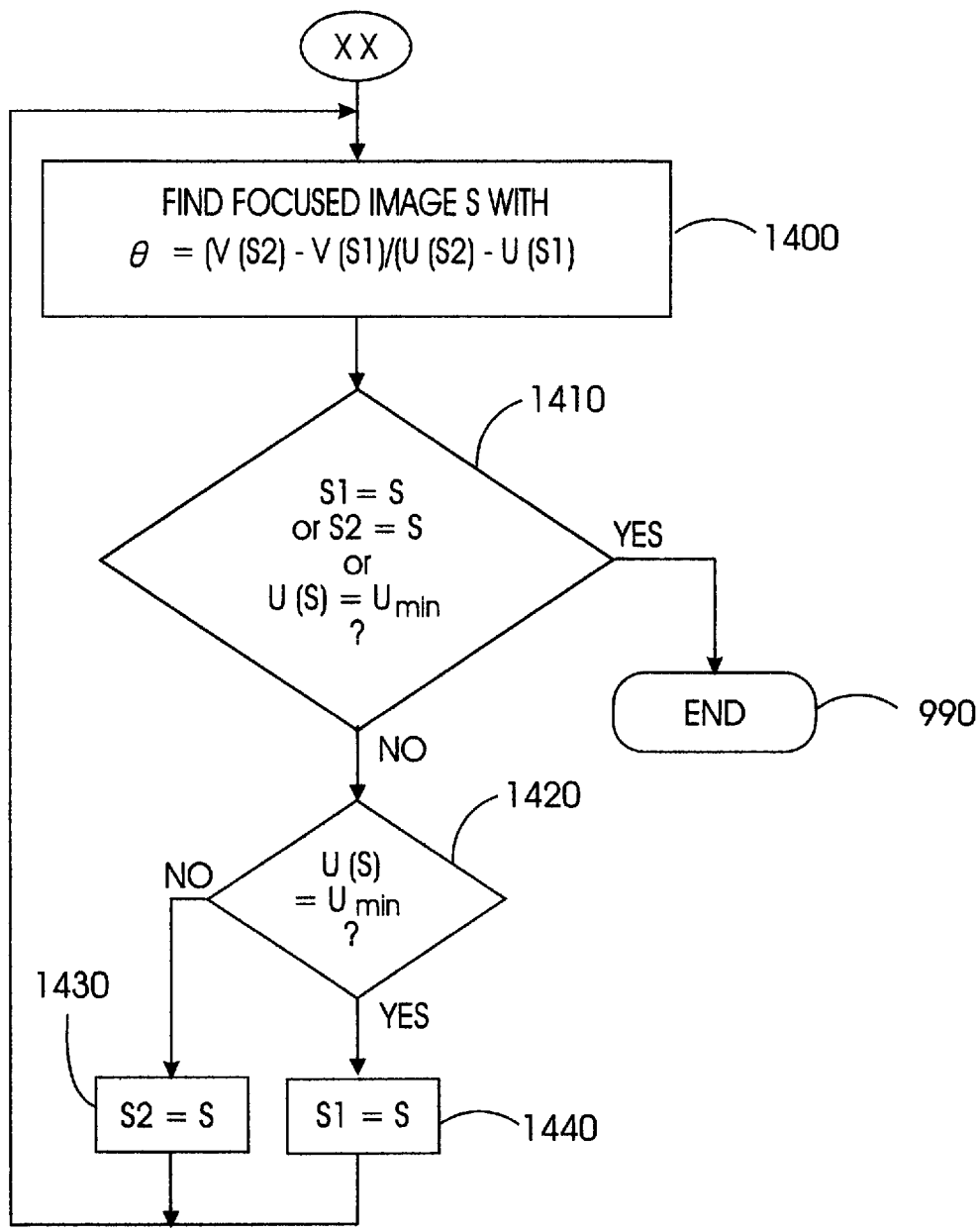
FIG. 12 is a flowchart showing the second part of the process for deriving the maximized confidence rule.

One or more focused image can be found using the above steps. It may be possible to continuously present the found focused images to the user in an order of (a), (b) and (c) as shown in FIG. 10. Each shaded area in FIG. 10 is a segmented area (focused image).

b) A case of maximized confidence rule (FIGS. 11 and 12)

In this case, according to the definition of the rule, the minimum support minsup (ratio of included data to the number of entire data) would be input (step 910). Here, $U_{min}=U_{num}*$minsup is calculated. Now, referring to FIG. 5, a vertical dotted line designated as the minimum support corresponds to this value. Then, a focused image $S_1$ is calculated with $\theta=V_{sum}/U_{sum}$ (step 920). The process branches to three cases depending on the number of data included in $S_1$ (U ($S_1$)) (step 930). If U ($S_1$)=$U_{min}$, $S_1$ is naturally output as the solution, the process completes (step 990). If U ($S_1$)<$U_{min}$, a focused image $S_2$ is calculated with θ=0 (step 940). If the result is U ($S_2$)≈$U_{min}$ (step 950), $S_2$ is naturally output as the solution, and the process completes. In this case, $S_1$=$S_2$ is not established if minsup is less than one. However, if $S_1$=$S_2$, there is no solution and no solution is output. Otherwise, the process proceeds to FIG. 12 through XX. If U ($S_1$)>$U_{min}$, a focused image $S_2$ is calculated with θ=1 (step 960). For $S_1$=$S_2$, since there is no focus point with confidence lager than $S_1$, the process outputs $S_1$ (and, of course, $S_2$ also) as an optimum solution, and completes (step 970). Likewise, for U ($S_2$)=$U_{min}$, the process outputs $S_2$ and completes. If it is determined for the condition identified previously not to be satisfied in step 970, the process proceeds to FIG. 12 through XX.

In FIG. 12, the process starts at XX to find a new condition θ, and to calculate a focused image for this θ (step 1400). This θ is calculated as θ=(V ($S_2$)−V ($S_1$))/(U ($S_2$)−U ($S_1$). Then, if $S_1$=S or $S_2$=S, there is no other focused image in ($S_1$, $S_2$) so that $S_2$ with higher confidence is output an optimum solution, and the process completes (step 1410). If U (S)≈$U_{min}$, the process outputs S and completes.

However, if U (S)<$U_{min}$ (step 1420), processing is further required, and the process returns to step 1400 with $S_1$=S (step 1430). Likewise, if U (S)>$U_{min}$, the process returns to step 1400 with $S_2$=S (step 1440).

Figure 13:
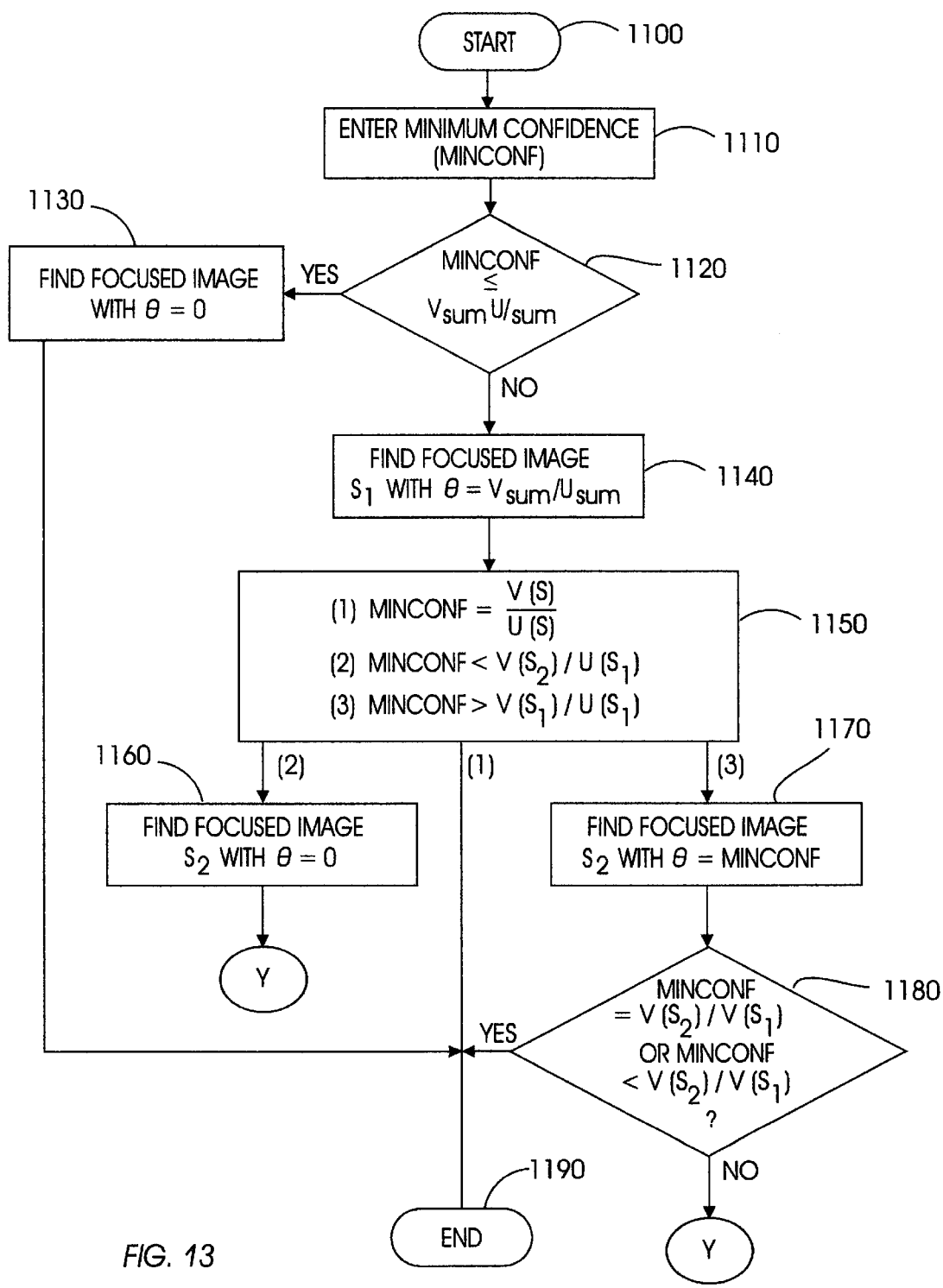
FIG. 13 is a flowchart showing the first part of the process for deriving the maximized support rule.
Figure 14:
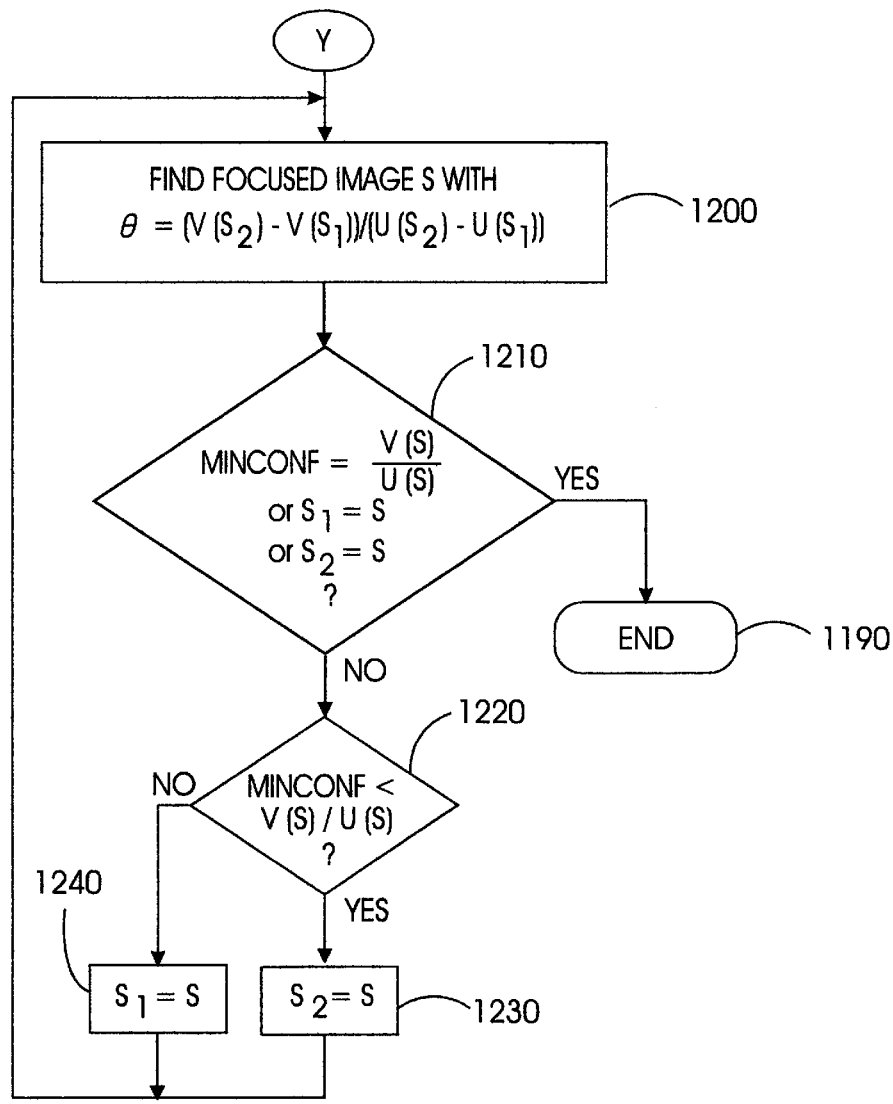
FIG. 14 is a flowchart showing the second part of the process for deriving the maximized support rule.

A solution can be found by repeating these steps. Referring to FIG. 5, a region in which solutions exist is shown as a darker area to the right of the minimum support described earlier. In the case of FIG. 5, while white dots within the convex hull are strict solutions, according to the present invention, approximate solutions obtained by the hand probe are output. It may be arranged so that the found solution is presented to the user, or attributes necessary for data belonging to the focused image are output.

c) A case of maximized support rule (FIGS. 13 and 14)

For this rule, as defined, minimum confidence, that is, the ratio of the number of data whose true-false attribute representing true to the number of included data is input (step 1110). In the case of FIG. 5, this is represented by a dotted line designated as the minimum confidence and drawn form the origin. Then, whether or not minconf≦$V_{sum}/U_{sum}$ is determined (step 1120). If this condition is met, since all points on the convex hull meet the confidence, a focused image is found with θ=0, and output (step 1130). On the other hand, if minconf>$V_{sum}/U_{sum}$ in step 1120, a focused image $S_1$ is found with θ=$V_{sum}/U_{sum}$ (step 1140). Here, three cases are considered (step 1150). If minconf=V (S)/U ($S_1$), the process outputs $S_1$ and completes (1190). If minconf<V ($S_1$)/U ($S_1$), a focused image $S_2$ with θ=0 is found (step 1160). Since V ($S_2$)=$V_{sum}$ and U ($S_2$)=$U_{sum}$ for this $S_2$, minconf≦V (S2)/U (S2) cannot be established. Similarly, then there is no $S_1$=$S_2$. Thus, the process enters into Y to proceed to FIG. 14 (step 1160). If minconf>V ($S_1$)/U ($S_1$), a focused image $S_2$ with θ=minconf is found (step 1170). If minconf=V (S2)/U ($S_2$) can be established for $S_2$, where $S_2$ is a strict solution, the process outputs it and completes. If minconf<V ($S_2$)/U ($S_2$), there is no solution. The process returns no solution and completes. On the other hand, if minconf>V ($S_2$)/U ($S_2$), the process enters in Y to proceed to the steps of FIG. 14.

In FIG. 14, the process starts at Y, and finds a focused image S with θ=(V ($S_2$)−V ($S_1$))/(U ($S_2$)−U ($S_1$)) (step 1200). For the found focused image S, if minconf=V (S)/U (S) is established, the process outputs this S and completes (step 1210). If $S_1$=S or $S_2$=S, there is no other solution between $S_1$ and $S_2$. The process outputs $S_1$ as an optimum solution and completes (step 1210). On the other hand, if minconf<V (S)/U (S) (step 1220), the process sets $S_1$=S and returns to step 1200 (step 1230). If minconf>V (S)/U (S), the process sets $S_2$=S and returns to step 1200 (step 1240).

The maximized support rule can be found as described above. Referring to FIG. 5 again, solutions exist for a darker area above the dotted line designated as the minimum confidence, as described above. In this example, white dots in the convex hull are strict solutions. The present invention is arranged to output approximate solutions which maximize support for points on the convex hull because points within the convex hull require enormous amount of calculation. As described earlier, it may be arranged so that the found approximate or strict solution is presented to the user, or that attribute values necessary for data included in the focused image are output.

d) A case of optimized entropy rule

The optimized entropy rule is a rule in which, when the inside and outside of an area is considered to be divided, increment of the amount of information after division when compared with the amount of information before division is maximized. Thus, an area may be discovered in which the gain of entropy for a segmented area and the whole plane (defined by the following equation) is maximized.

$$f(x,y) = -\frac{y}{a}\log\frac{y}{a} - \frac{x-y}{a}\log\frac{x-y}{a} - \frac{b-y}{a-x}\log\frac{b-y(26)}{a-x}$$
$$- \frac{a-b-x+y}{a-x}\log\frac{a-b-x+y}{a-x}$$

where x is U (S), y is V (S), a is $U_{sum}$, and b is $V_{sum}$. Since it has been found that solutions exist on a convex hull even under such conditions, the steps described above can be used. Thus, a focused image may be found which maximizes Equation 26 by varying θ.

e) A case of optimized interclass variance rule

As described earlier, the optimized interclass variance rule is a rule in which, when the inside and outside of an area is considered to be divided, the sum of squares of the internal and external "variance of standardized ratio of true and false from average" is maximized. Thus, an area may be found in which interclass variance of a segmented area and the whole plane (defined by the following equation) is maximized.

$$f(x,y) = x\left(\frac{y}{x} - \frac{b}{a}\right)^2 + (a+x)\left(\frac{b-a}{a-x} - \frac{b}{a}\right)^2 \quad (27)$$

where x, y, a, and b are same as those described above. Since it has been found that solutions exist on a convex hull even under such conditions, the steps described above can be used. Thus, a focused image may be discovered which maximizes Equation 27 by varying θ.

f) Others

As described above, when U (S) and V (S) exist or do not exist on points on a convex hull, it is possible to derive at a high speed an area appropriate for a rule by using the steps described above.

g) Extraction of secondary rule

After one rule is found by using the above-described process, a secondary rule(s) can be found. That is, it is attained by eliminating v (i, j) belonging to one of the segmented focused image, varying v (i, j) to provide v (i, j)/u (i, j)=$V_{sum}/U_{sum}$, and newly performing an area segmenting step.

Figure 15:
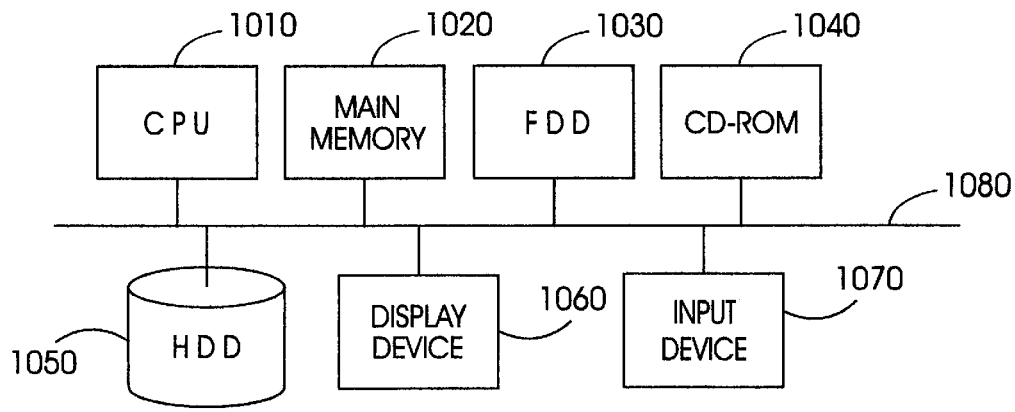
FIG. 15 is a block diagram showing an example of system configuration when the present invention is implemented on a conventional computer system.
Figure 17:
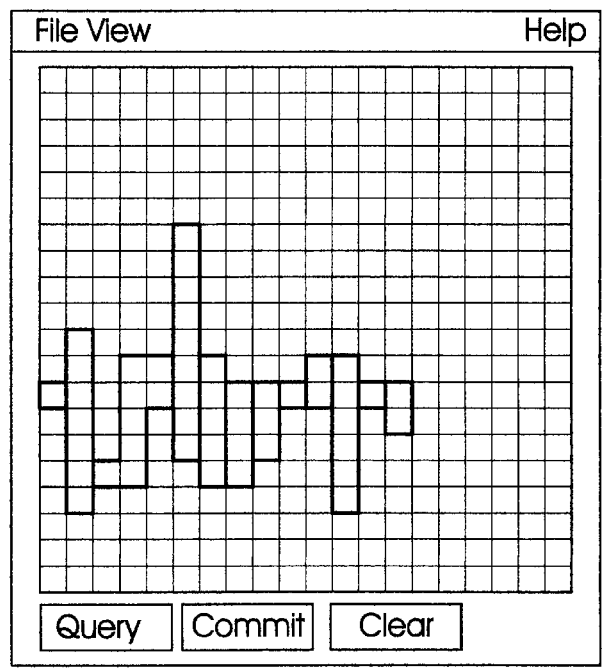
FIG. 17 is an example of displays on the display device shown in FIG. 15.

The process according to the present invention has been described above. Such a process may be implemented and executed by a computer program. For example, the program may be written to be executed on a typical computer system shown in FIG. 15. The processing program is stored in a hard disk drive (HDD) 1050, loaded into a main memory 1020 for execution, and processed by a CPU 1010. The HDD 1050 also stores a database to which the HDD 1050 accesses. An initial plane and focused images (FIG. 17) are presented to a user by a display device 1060. The user uses an input device 1070 to select focused images and to input an instruction for data output. Such input device includes a keyboard, a mouse, a pointing device, and a digitizer. In addition, the result of output may be stored in an secondary storage device such as a floppy disk in a (floppy diskette drive) FDD 1030, and new data may be input from the FDD 1030. Moreover, data may be input by using a CD-ROM drive 1040.

Furthermore, the computer program implementing the processing process of the present invention may be stored in a storage medium such as a floppy disk or CD-ROM for carrying-about. In such case, a data fetching section in a conventional database retrieval program or a program only for display on the display device 1060 may have been stored in the HDD 1050. Thus, it is a conventional approach that portions other than them are distributed by a storage medium as described above.

Figure 16:
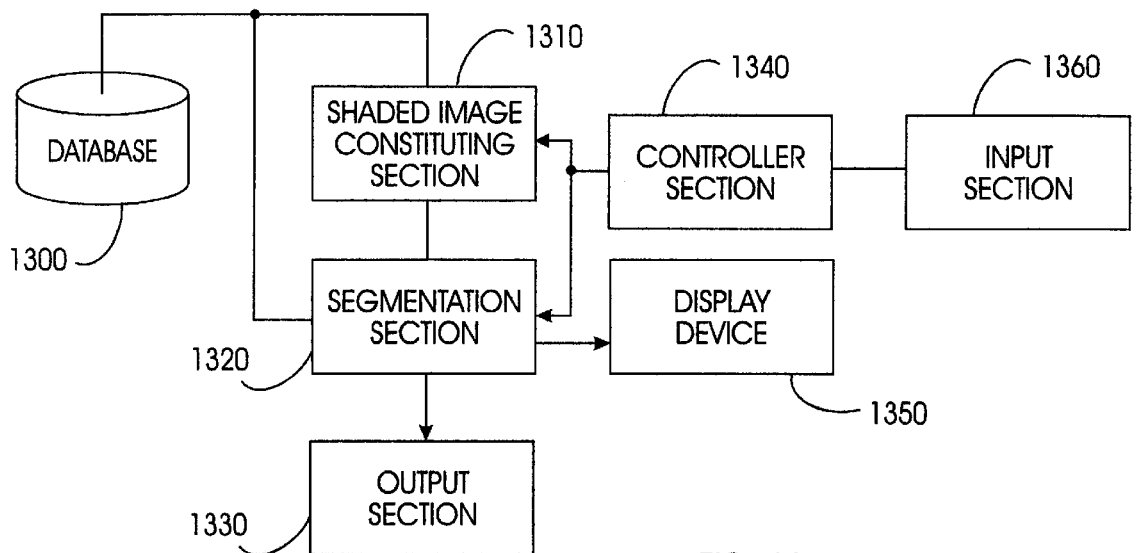
FIG. 16 is a block diagram when the present invention is implemented by a dedicated device.

A device dedicated for performing the process according to the present invention may be provided. For example, a device shown in FIG. 16 may be contemplated. A plane constituting section 1310 is connected to a database 1300 and a segmentation section 1320, and receives an instruction from the controller section 1340. The segmentation section 1320 is connected to the output section 1330 and the display device 1350, and receives an instruction from the controller section 1340. The segmentation section 1130 also has a connection to the database. The controller section 1340 is connected to an input section 1360, and controls the plane constituting section 1310 and the segmentation section 1320 depending on the type of processing instructed by the input section 1360.

The operation of this device is briefly explained. The plane constituting section 1310 is a section to perform the plane constituting step described earlier. Thus, the plane constituting section 1310 constitutes a plane indicated above by using data stored in the database, and outputs it to the segmentation section 1320. The segmentation section 1320 sets θ, a parameter for segmentation, according to an instruction from the controller section 1340. The segmentation section 1320 performs the segmentation step according to the set θ to segment a focused image. It then outputs the focused image to the display device 1350, and, if directed by the user, fetches data belonging to the segmented focused image from the database 1300 and passes it to the output section 1330. The output section 1330 outputs data desired by the user in an appropriate format. In addition, the user instructs through the input section 1360 to solve the maximized confidence rule, and inputs the minimum supports. Then, the controller section 1340 sets a condition θ to perform the process (b) described above, and outputs it to the segmentation section 1320. The segmentation section 1320 then performs processing such as varying the condition θ to solve an area meeting the instructed maximized confidence rule. The controller section 1340 performs processing to pass the condition θ to the segmentation section 1320, the condition θ being a condition suitable for the maximized support rule (process (c), the optimized entropy rule (process (d), the optimized interclass variance rule (process (e), and the other process (f) for segmenting an area positioned on a convex hull all of which are described in the above. The user inputs the type of processing and the condition described earlier (not only θ but also minconf and minsup) through the input section 1360. In addition, the controller section 1340 instructs the plane constituting section 1310 to perform processing such as elimination of V (i, j) of the segmented focused image to perform process (g).

While an example of dedicated device for the present invention has been illustrated in the above, the present invention is not limited to such specific arrangement. For example, output of the segmentation section 1320 may be arranged to be output to the output section 1330 and the display device 1350 through an output control section. In this case, data may be arranged to be fetched out by referencing the database through the output control section.

While the process described above is to find correlation between numerical attributes by selecting two kinds from k kinds of numerical attributes which data normally possesses, it can be extended to an n-th dimension search if an area in an n-th dimensional space can be segmented using Equation 11 as an objective function.

As described in the above, the method of the invention can be used to derive correlation between a plurality of data having two kinds of numerical attributes and a true-false attribute.

The method can do derive a range (area) satisfying: (1) the maximized support rule, (2) the maximized confidence rule, (3) the optimized entropy rule, and (4) the optimized interclass variance rule.

In addition, it can calculate the above-described correlation between a plurality of data.

Furthermore, the method can present the correlation between a plurality of data in a form easily recognizable for a human operator.

For example, since it is possible to find customers included in an area as bulk as possible at a certain ratio or more, and interesting in, for example, outdoor sports (corresponding to the true-false attribute), the data on these customers can then be used to determine direct mail addresses which is desired to be known by many customers meeting such conditions (maximized support rule).

Since it is possible to find a range which includes a certain number of customers or more, and in which the ratio of customers having time deposit balance of two million yen or more is maximized, it is possible to conduct effective advertizing activities while narrowing target customers (maximized confidence rule).

What is claimed is:

1. A method for deriving an association rule between a plurality of data in a database, each said data including at least two kinds of numerical attributes and one kind of true-false attribute, comprising the steps of:

constituting a plane, said plane having two axes corresponding to said two kinds of numerical attributes, divided into N×M buckets, and storing a number u(i, j) of data included in each bucket (i, j) and a number v(i, j) of data whose true-false attribute represents true in each bucket;

inputting a condition θ;

segmenting an area S from the plane, wherein the buckets included in said area S maximize $$\sum_{(i,j) \in S} g(i,j) = \sum_{(i,j) \in S} (v(i,j) - \theta u(i,j)); \text{ and}$$

outputting data included in said segmented area S.

2. The method for deriving an association rule as set forth in claim 1, further comprising the steps of:

inputting a second condition $\theta_2$ different from said condition θ;

segmenting a second area $S_2$ from said plane, wherein the buckets included in said area $S_2$ maximize $$\sum_{(i,j) \in S_2} g(i,j) = \sum_{(i,j) \in S_2} (v(i,j) - \theta_2 u(i,j)); \text{ and}$$

segmenting a third area $S_3$ from said plane, wherein the buckets included in said area $S_3$ maximize $$\sum_{(i,j) \in S_3} g(i,j) = \sum_{(i,j) \in S_3} (v(i,j) - \theta_3 u(i,j))$$

with a third condition $$\theta_3 = \frac{V(S_2) - V(S)}{U(S_2) - U(S)},$$

where $V(S_2)$ is the number of data included in said area $S_2$ and whose true-false attribute represents true, $V(S)$ is the number of data included in said area S and whose true-false attribute represents true, $U(S_2)$ is the number of data included in said area $S_2$, and $U(S)$ is the number of data included in said area S.

3. The method for deriving an association rule as set forth in claim 1, further comprising the steps of:

modifying v(i, j) such that v(i, j)/u(i, j) in each bucket in said segmented area S becomes equal to the ratio of the number of data whose true-false attribute represents true in the whole plane to the number of data in the whole plane; and segmenting a fourth area $S_4$, wherein buckets included in said area $S_4$ maximize $$\sum_{(i,j)\in S_4} g(i,j) = \sum_{(i,j)\in S_4} (v(i,j) - \theta_4 u(i,j))$$

by using said modified v(i, j) according to a condition $\theta_4$ which is input.

4. The method for deriving an association rule as set forth in claim 1, wherein said plane constituting step comprises the steps of:

randomly sampling X data from said plurality of data;

sorting the sampled data for each of said numerical attributes and storing a value corresponding to the (X*i/N)-th data where i=1, 2, . . . N, and a value corresponding to the (X*n/M)-th data, where n=1, 2, . . . M; and placing said plurality of data into said N×M buckets based on said stored values.

5. The method for deriving an association rule as set forth in claim 1, wherein g(i, j)=v(i, j)−θu(i, j) is used as an evaluation value; and
   said area segmenting step comprises the steps of:

a) deriving a range in each column in said plane, wherein said range includes at least one bucket and an evaluation value of said range is maximized;

b) when an addition region is defined as a region which includes an area having a first bucket (m−1, l) in a previous column of a second bucket (m, t) in said plane and having a maximum evaluation value up to the previous column and a range, derived by said range deriving step, including said second bucket (m, t) and a third bucket (m, l) on the same row as said first bucket and on the same column as said second bucket and having a maximum evaluation value on the column of the second and third buckets, for each of said second buckets:

i) detecting one of the first buckets whose inclusion with the second bucket in the addition region makes an evaluation value of the addition region maximum, and ii) storing said evaluation value of said addition region and said one of the first buckets; and c) detecting one of said second buckets included in said addition region which has a maximum evaluation value on said whole plane, and deriving said area S by using said first bucket detected in said detecting and storing step for said detected one of said second buckets.

6. The method for deriving an association rule as set forth in claim 1, further comprising the steps of:

inputting the minimum support number $U_{min}$, wherein $U_{min}$ is the minimum number of data included in the area to be segmented;

comparing the number of data U(S) included in said segmented area S with the minimum support number $U_{min}$;

if said comparison indicates $U_{min}$=U(S), then outputting said area S as the area to be segmented; and, if said comparison indicates $U_{min}$>U(S) or $U_{min}$<U(S), then performing said area segmenting step under a new condition $\theta_5$.

7. The method for deriving an association rule as set forth in claim 1, further comprising the steps of:

inputting minconf, which is the ratio of said number of data whose true-false attribute represents true in the area to be segmented to the number of data in the area to be segmented;

if minconf=V(S)/U(S) for said segmented area S, where U(S) is the number of data included in said area S, V(S) is the number of data included in said area S and whose true-false attribute represents true in the area, then outputting said area S; and, if minconf<V(S)/U(S) or minconf>V(S)/U(S), then performing said area segmenting step under a new condition $\theta_6$.

8. The method for deriving an association rule as set forth in claim 1, further comprising the steps of:

for said segmented area S, calculating an entropy by $$f(U(S),V(S)) = -\frac{V(S)}{U_{sum}} \log \frac{V(S)}{U_{sum}} - \frac{U(S) - V(S)}{U_{sum}} \log \frac{U(S) - V(S)}{U_{sum}} -$$

$$\frac{V_{sum} - V(S)}{U_{sum} - U(S)} \log \frac{V_{sum} - V(S)}{U_{sum} - U(S)} -$$

$$\frac{U_{sum} - V_{sum} - U(S) + V(S)}{U_{sum} - U(S)} \log \frac{U_{sum} - V_{sum} - U(S) + V(S)}{U_{sum} - U(S)}$$

where $U_{sum}$ is the number of data over said entire plane, and $V_{sum}$ is the number of data included in said entire plane whose true-false attribute represents true, and storing the entropy value in correspondence to said area S;

performing said area segmenting step and said entropy calculating step with a modified condition θ; and outputting an area S which makes f (U(S), V(S)) maximized.

9. The method for deriving an association rule as set forth in claim 1, further comprising the steps of:

for said segmented area S, calculating an interclass variance by $$f(U(S),V(S)) = U(S) \left( \frac{V(S)}{U(S)} - \frac{V_{sum}}{U_{sum}} \right)^2 +$$

$$(U_{sum} - U(S)) \left( \frac{V_{sum} - V(S)}{U_{sum} - U(S)} - \frac{V_{sum}}{U_{sum}} \right)^2$$

where $U_{sum}$ is the number of data over said entire plane, and $V_{sum}$ is the number of data included in said entire plane whose true-false attribute represents true, and storing the interclass variance value in correspondence to said area S;

performing said area segmenting step and said interclass variance calculating step with a modified the condition θ; and outputting an area S which makes f (U(S), V(S)) maximized.

10. An apparatus for deriving an association rule between a plurality of data in a database, each said data including at least two kinds of numerical attributes and one kind of true-false attribute, comprising:

means for constituting a plane, said plane having two axes corresponding to said two kinds of numerical attributes, divided into N×M buckets, and storing a number u(i, j) of data included in each bucket (i, j) and a number v(i, j) of data whose true-false attribute represents true in each bucket;

means for inputting a condition θ;

means for segmenting an area S from the plane, wherein the buckets included in said area S maximize $$\sum_{(i,j)\in S} g(i,j) = \sum_{(i,j)\in S} (v(i,j) - \theta u(i,j)); \text{ and}$$

means for outputting data included in said segmented area S.

11. The apparatus for deriving an association rule as set forth in claim 10, wherein said input means inputs a second condition $\theta_2$ different from said condition $\theta$, said area segmenting means segments a second area $S_2$ corresponding to said second condition $\theta_2$ from said plane, and the apparatus further comprises:

means for outputting to said area segmenting means $$\theta_3 = \frac{V(S_2) - V(S)}{U(S_2) - U(S)}$$

as a third condition, where $V(S_2)$ is the number of data included in said area $S_2$ and whose true-false attribute represents true, $V(S)$ is the number of data included in said area S and whose true-false attribute represents true, $U(S_2)$ is the number of data included in said area $S_2$, and $U(S)$ is the number of data included in said area S.

12. The apparatus for deriving an association rule as set forth in claim 10, further comprising:

means for modifying $v(i,j)$ such that $v(i,j)/u(i,j)$ in each bucket in said segmented area S becomes equal to the ratio of the number of data whose true-false attribute represents true in the whole plane to the number of data in the whole plane; and means for directing said area segmenting means to operate under said modified $v(i,j)$ and an input condition $\theta_4$.

13. The apparatus for deriving an association rule as set forth in claim 10, wherein said plane constituting means comprises:

means for randomly sampling X data from said plurality of data;

means for sorting the sampled data for each of said numerical attributes and storing a value corresponding to the (X*i/N)-th data, where i=1, 2, ... N, and a value corresponding to the (X*n/M)-th data, where n=1, 2, ... M; and means for placing said plurality of data into said N×M buckets based on said stored values.

14. The apparatus for deriving an association rule as set forth in claim 10, wherein $$g(i, j) = v(i, j) - \theta u(i, j)$$

is used as an evaluation value; and said area segmenting means comprises:
a) means for deriving a range in each column in said plane, wherein said range includes at least one bucket and the evaluation value is maximized;
b) means, when an addition region is defined as a region which includes an area having a first bucket (m−1, l) in a previous column of a second bucket (m, t) in said plane and having a maximum evaluation value up to the previous column and a range, derived by said range deriving means, including said second bucket (m, t) and a third bucket (m, l) in the same row as said first bucket and in the same column as said second bucket and having a maximum evaluation value in the column of the second and third buckets, for each of said second buckets, for i) detecting one the fist buckets whose inclusion with the second bucket in the addition region makes an evaluation value of the addition region maximum, and ii) storing said evaluation value of said addition region and said one of the first buckets; and
c) means for detecting one of said second buckets in said addition region which has a maximum evaluation value in said whole plane, and for deriving said area S by using said first bucket detected in said detecting and storing means for said detected one of said second bucket.

15. The apparatus for deriving an association rule as set forth in claim 10, further comprising:

means for inputting the minimum support number $U_{min}$, wherein $U_{min}$ is the minimum number of data included in the area to be segmented;

means for comparing the number of data U(S) included in said segmented area S with the minimum support number $U_{min}$;

if said comparison indicates $U_{min}=U(S)$, then means for outputting said area S as the area to be segmented; and, if said comparison indicates $U_{min}>U(S)$ or $U_{min}<U(S)$, then means for directing said area segmenting means to operate under a new condition $\theta_5$.

16. The apparatus for deriving an association rule as set forth in claim 10, further comprising:

means for inputting minconf, which is the ratio of said number of data whose true-false attribute represents true in the area to be segmented to the number of data in the area to be segmented;

if minconf=V(S)/U(S) for said segmented area S, where U(S) is the number of data included in said area S, V(S) is the number of data included in said area S and whose true-false attribute represents true, then means for outputting said area S; and, if minconf<V(S)/U(S) or minconf>V(S)/U(S), then means for directing said area segmenting means to operate under a new condition $\theta_8$.

17. The apparatus for deriving an association rule as set forth in claim 10, further comprising:

means, for said segmented area S, for calculating an entropy by $$f(U(S),V(S)) = -\frac{V(S)}{U_{sum}} \log \frac{V(S)}{U_{sum}} - \frac{U(S) - V(S)}{U_{sum}} \log \frac{U(S) - V(S)}{U_{sum}} - \frac{V_{sum} - V(S)}{U_{sum} - U(S)} \log \frac{V_{sum} - V(S)}{U_{sum} - U(S)} - \frac{U_{sum} - V_{sum} - U(S) + V(S)}{U_{sum} - U(S)} \log \frac{U_{sum} - V_{sum} - U(S) + V(S)}{U_{sum} - U(S)}$$

where $U_{sum}$ is the number of data over said entire plane, and $V_{sum}$ is the number of data included in said entire plane whose true-false attribute represents true, and for storing the entropy value in correspondence to said area S;

means for directing said area segmenting means and said entropy calculating means to operate with a modified condition $\theta$; and means for outputting an area S which makes f (U(S), V(S)), stored in said entropy calculating means, maximized.

18. The apparatus for deriving an association rule as set forth in claim 10, further comprising:

means, for said segment area S, for calculating an interclass variance by $$f(U(S), V(S)) = U(S)\left(\frac{V(S)}{U(S)} - \frac{V_{sum}}{U_{sum}}\right)^2 +$$

$$(U_{sum} - U(S))\left(\frac{V_{sum} - V(S)}{U_{sum} - U(S)} - \frac{V_{sum}}{U_{sum}}\right)^2$$

where $U_{sum}$ is the number of data over said entire plane, and $V_{sum}$ is the number of data included in said entire plane whose true-false attribute represents true, and for storing the interclass variance value in correspondence to said area S;

means for directing said area segmenting means and said interclass variance calculating means to operate with a modified condition θ;

outputting an area S which makes f (U(S), V(S)), stored in said interclass variance calculation means, maximized.

19. A storage device comprising program code means for causing a computer to derive an association rule between a plurality of data in a database, each said data including at least two kinds of numerical attributes and one kind of true-false attribute, said program code means comprising:

plane constituting program code means, said plane having two axes corresponding to said two kinds of numerical attributes, and divided into N×M buckets, said plane constituting program code means causing the computer to store a number u(i, j) of data included in each bucket (i, j) and a number v(i, j) of data whose true-false attribute represents true in each bucket;

input program code means for causing the computer to input a condition θ;

area segmentation program code means for causing the computer to segment an area S from the plane, wherein the buckets included in said area S maximize $\sum_{(i,j)\in S} g(i,j) = \sum_{(i,j)\in S} (v(i,j) - \theta u(i,j));$ and program code means for outputting data included in said segmented area $S$.

20. The storage device as set forth in claim 19, wherein said input program code means inputs a second condition $\theta_2$ different from said condition θ, said area segmenting program code means segments a second area $S_2$ corresponding to said second condition $\theta_2$ from said plane, and said storage device further comprises:

program code means for outputting to said area segmenting program code means, $$\theta 3 = \frac{V(S_2) - V(S)}{U(S_2) - U(S)}$$

as a third condition, where $V(S_2)$ is the number of data included in said area $S_2$ and whose true-false attribute represents true, V(S) is the number of data included in said area S and whose true-false attribute represents true, $U(S_2)$ is the number of data included in said area $S_2$, and U(S) is the number of data included in said area S.

21. The storage device as set forth in claim 19, further comprising:

program code means for causing the computer to modify v(i, j) such that v(i, j)/u(i, j) in each bucket in said segmented area S becomes equal to the ratio of the number of data whose true-false attribute represents true in the whole plane to the number of data in the whole plane; and program code means for directing the computer and said area segmenting program code means to operate under said modified v(i, j) and an input condition $\theta_4$.

22. The storage device as set forth in any one of claims 19, wherein said plane constituting program code means comprises:

program code means for causing the computer to randomly sample X data from said plurality of data;

program code means for causing the computer to sort the sampled data for each of said numerical attributes and storing a value corresponding to the (X*i/N)-th data, where i=1, 2, . . . N, and a value corresponding to the (X*n/M)-th data, where n=1, 2, . . . M; and program code means for causing the computer to place said plurality of data into said N×M buckets based on said stored values.

23. The storage device as set forth in claim 19, wherein g (i, j)=v (i, j)−θu (i, j) is used as an evaluation value; and said area segmenting program code means comprises:

a) range deriving program code means for causing the computer to derive a range in each column in said plane, wherein a range includes at least one bucket and the evaluation value of said range is maximized;

b) detecting and storing program code means, when an addition region is defined as a region which includes an area having a first bucket (m−1, l) in a previous column of a second bucket (m, t) in said plane and having a maximum evaluation value up to the previous column and a range, derived by said range deriving program means and the computer, including said second bucket (m, t) and a third bucket (m, l) in the same row as said first bucket and in the same column as said second bucket and having a maximum evaluation value in the column of the second and third buckets, for each of the second buckets, for causing the computer i) to detect one of the first buckets whose inclusion with the one second bucket in the addition region makes the evaluation value of the addition region maximum, and ii) to store said evaluation value of said addition region and said one of the first buckets; and c) program code means for causing the computer to detect one of said second bucket included in said addition region which has a maximum evaluation value in said whole plane, and to derive an area S by using said first bucket detected in said detecting and storing program code means for said detected one of said second bucket.

* * * * *